United States Patent
Lee et al.

(10) Patent No.: US 12,550,099 B2
(45) Date of Patent: Feb. 10, 2026

(54) ENHANCED PAGING SERVICES WITH IDENTITY MANAGEMENT FOR WIRELESS NETWORKS

(71) Applicant: QUALCOMM Incorporated, San Diego, CA (US)

(72) Inventors: Soo Bum Lee, San Diego, CA (US); Miguel Griot, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/458,021

(22) Filed: Aug. 29, 2023

(65) Prior Publication Data

US 2025/0081138 A1    Mar. 6, 2025

(51) Int. Cl.
*H04W 60/04* (2009.01)
*H04W 68/02* (2009.01)

(52) U.S. Cl.
CPC ........... *H04W 60/04* (2013.01); *H04W 68/02* (2013.01)

(58) Field of Classification Search
CPC ..... H04W 60/04; H04W 68/02; H04W 12/06; H04W 60/00; H04W 12/75; H04W 8/26
See application file for complete search history.

(56) References Cited

U.S. PATENT DOCUMENTS

| | | | |
|---|---|---|---|
| 11,140,600 B2 * | 10/2021 | Kubota | H04W 74/00 |
| 12,335,911 B2 * | 6/2025 | Chun | H04W 76/10 |
| RE50,591 E * | 9/2025 | Walldeen | H04W 76/19 |
| 12,412,427 B1 * | 9/2025 | Chuang | G16H 20/30 |
| 12,414,169 B2 * | 9/2025 | Selvaganapathy | H04W 76/15 |
| 2008/0133905 A1 * | 6/2008 | Challener | H04L 9/3226 |
| | | | 713/156 |
| 2016/0135016 A1 * | 5/2016 | Zou | H04W 72/23 |
| | | | 370/312 |
| 2018/0270786 A1 * | 9/2018 | Nair | H04W 68/00 |
| 2019/0166493 A1 | 5/2019 | You et al. | |

(Continued)

FOREIGN PATENT DOCUMENTS

| | | |
|---|---|---|
| WO | WO-2018089615 A1 | 5/2018 |
| WO | WO-2022170556 | 8/2022 |

OTHER PUBLICATIONS

CableLabs: "MAC and Upper Layer Protocols Interface Specification", Data-Over-Cable Service Interface Specifications DOCSIS® 3.0, Jan. 11, 2017, pp. 1-795, XP055492550, p. 315-p. 318.

(Continued)

*Primary Examiner* — Faruk Hamza
(74) *Attorney, Agent, or Firm* — Polsinelli

(57) ABSTRACT

An apparatus, method and computer-readable media are disclosed for performing wireless communications. For example, a process for wireless communications can include transmitting, to an identity and routing service, a service registration request, wherein the service registration request includes a service identifier for the network service, wherein the network service is separate from the identity and routing service; receiving, from the identity and routing service, a first temporary service identifier (TSID) for the network service; allocating a first temporary device identifier (TUID) to a device; and transmitting the first TSID and first TUID to the device for a first security context.

22 Claims, 16 Drawing Sheets

(56) References Cited

U.S. PATENT DOCUMENTS

| | | | |
|---|---|---|---|
| 2021/0092706 A1* | 3/2021 | Ozturk | H04W 76/11 |
| 2023/0163984 A1 | 5/2023 | Shan | |
| 2023/0262836 A1* | 8/2023 | Yu | H04L 1/1812 |
| 2023/0319549 A1* | 10/2023 | Dees | H04W 12/06 |
| | | | 455/410 |
| 2023/0388967 A1* | 11/2023 | Chang | H04W 76/25 |
| 2024/0251228 A1* | 7/2024 | Chun | H04W 76/14 |
| 2025/0287462 A1* | 9/2025 | Li | H04W 76/27 |

OTHER PUBLICATIONS

International Search Report and Written Opinion—PCT/US2024/043097—ISA/EPO—Nov. 26, 2024.

ITU-T J.112: "Series J: Cable Networks and Transmission of Television, Sound Programme and Other Multimedia Signals Interactive Systems for Digital Television Distribution", Transmission Systems for Interactive Cable Television Services Annex C: Dataover-Cable Service Interface Specifications: Radio-frequency Interface Specification Using QAM Technique, "T-REC-J.112-200202-I!AnnC!PDF-E", ITU-T Draft, Study Period 2013-2016, International Telecommunication Union, Geneva, CH, Nov. 13, 2015, 304 Pages, Feb. 2002, XP044141116, paragraph [C.11.2.11].

* cited by examiner

ENHANCED PAGING SERVICES WITH IDENTITY MANAGEMENT FOR WIRELESS NETWORKS

FIELD

The present disclosure generally relates to wireless communications. For example, aspects of the present disclosure relate to enhanced paging services with identity management for wireless networks.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. A sixth-generation (6G) mobile standard may build on 5G to offer further increased data transfer speeds, better coverage, and improved security, among other improvements.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications by a network service of a wireless network is provided. The apparatus includes a memory system comprising instructions and a processor system coupled to the memory system. The processor system is configured to: transmit, to an identity and routing service, a service registration request, wherein the service registration request includes a service identifier for the network service, wherein the network service is separate from the identity and routing service; receive, from the identity and routing service, a first temporary service identifier (TSID) for the network service; allocate a first temporary device identifier (TUID) to a device; and transmit the first TSID and first TUID to the device for a first security context.

In another example, a method for wireless communications by a network service of a wireless network is provided. The method includes: transmitting, to an identity and routing service, a service registration request, wherein the service registration request includes a service identifier for the network service, wherein the network service is separate from the identity and routing service; receiving, from the identity and routing service, a first temporary service identifier (TSID) for the network service; allocating a first temporary device identifier (TUID) to a device; and transmitting the first TSID and first TUID to the device for a first security context.

As another example, a non-transitory computer-readable medium is provided. The non-transitory computer-readable medium includes stored thereon instructions that, when executed by a processor system, cause the processor system to: transmit, to an identity and routing service, a service registration request, wherein the service registration request includes a service identifier for the network service, wherein the network service is separate from the identity and routing service; receive, from the identity and routing service, a first temporary service identifier (TSID) for the network service; allocate a first temporary device identifier (TUID) to a device; and transmit the first TSID and first TUID to the device for a first security context.

In another example, an apparatus for wireless communications by a network service of a wireless network is provided. The apparatus includes: means for transmitting, to an identity and routing service, a service registration request, wherein the service registration request includes a service identifier for the network service, wherein the network service is separate from the identity and routing service; means for receiving, from the identity and routing service, a first temporary service identifier (TSID) for the network service; means for allocating a first temporary device identifier (TUID) to a device; and means for transmitting the first TSID and first TUID to the device for a first security context.

As another example, an apparatus for wireless communications by a paging service of a wireless network is provided. The apparatus includes a memory system comprising instructions and a processor system coupled to the memory system. The processor system is configured to: receive a request for a paging identifier for a device; obtain a paging identifier for the device; output the paging identifier to the device; receive a paging request from a network service, wherein the network service is separate from the paging service, and wherein the paging request includes a permanent identifier for the device; map the permanent identifier for the device to the paging identifier for the device; and page the device using the paging identifier.

In another example, method for wireless communications by a paging service of a wireless network is provided. The method includes: receiving a request for a paging identifier for a device; obtaining a paging identifier for the device; outputting the paging identifier to the device; receive a paging request from a network service, wherein the network service is separate from the paging service, and wherein the paging request includes a permanent identifier for the device; mapping the permanent identifier for the device to the paging identifier for the device; and paging the device using the paging identifier.

As another example, a non-transitory computer-readable medium is provided. The non-transitory computer-readable medium includes stored thereon instructions that, when executed by a processor system, cause the processor system to: receive a request for a paging identifier for a device; obtain a paging identifier for the device; output the paging identifier to the device; receive a paging request from a network service, wherein the network service is separate from the paging service, and wherein the paging request includes a permanent identifier for the device; map the permanent identifier for the device to the paging identifier for the device; and page the device using the paging identifier.

In another example, an apparatus for wireless communications by a paging service of a wireless network is provided. The apparatus includes: means for receiving a request for a paging identifier for a device; means for obtaining a paging identifier for the device; means for outputting the paging identifier to the device; means for receive a paging request from a network service, wherein the network service is separate from the paging service, and wherein the paging request includes a permanent identifier for the device; means for mapping the permanent identifier for the device to the paging identifier for the device; and means for paging the device using the paging identifier.

As another example, an apparatus for wireless communications by an identity and routing service of a wireless network is provided. The apparatus includes a memory system comprising instructions; and a processor system coupled to the memory system. The processor system is configured to: receive, from a service of the wireless network, a service registration request, wherein the service registration request includes a service identifier for the service, wherein the service is separate from the identity and routing service; allocate a temporary service identifier (TSID) to the service, wherein the TSID is for use by the service for communications with a device; store a mapping between the service identifier and the allocated TSID; and transmit the TSID to the service.

In another example, a method for wireless communications by an identity and routing service of a wireless network is provided. The method includes: receiving, from a service of the wireless network, a service registration request, the service registration request including a service identifier for the service, wherein the service is separate from the identity and routing service; allocating a temporary service identifier (TSID) to the service, wherein the TSID is for use by the service for communications with a user device; storing a mapping between the service identifier and the allocated TSID; and transmitting the TSID to the service.

As another example, a non-transitory computer-readable medium is provided. The non-transitory computer-readable medium includes stored thereon instructions that, when executed by a processor system, cause the processor system to: receive, from a service of the wireless network, a service registration request, wherein the service registration request includes a service identifier for the service, wherein the service is separate from the identity and routing service; allocate a temporary service identifier (TSID) to the service, wherein the TSID is for use by the service for communications with a device; store a mapping between the service identifier and the allocated TSID; and transmit the TSID to the service.

In another example, an apparatus for wireless communications by an identity and routing service of a wireless network is provided. The apparatus includes: means for receiving, from a service of the wireless network, a service registration request, the service registration request including a service identifier for the service, wherein the service is separate from the identity and routing service; means for allocating a temporary service identifier (TSID) to the service, wherein the TSID is for use by the service for communications with a user device; means for storing a mapping between the service identifier and the allocated TSID; and means for transmitting the TSID to the service.

As another example, a device for wireless communications with a network service of a wireless network is provided. The device includes: a memory system comprising instructions; and a processor system coupled to the memory system, wherein the processor system is configured to: transmit, to the network service, a service access request; establish, based on the service access request, a first security context with the network service; receive a first temporary device identifier (TUID) and a first temporary service identifier (TSID) for the network service; transmit a service resume message to an identity and routing service, the service resume message including the first TUID and the TSID for the network service; and establish, based on the service resume message, a second security context with the network service.

In another example, a method for wireless communications with a network service of a wireless network is provided. The method includes: transmitting, to the network service, a service access request; establishing, based on the service access request, a first security context with the network service; receiving a first temporary device identifier (TUID) and a first temporary service identifier (TSID) for the network service; transmitting a service resume message to an identity and routing service, the service resume message including the first TUID and the TSID for the network service; and establishing, based on the service resume message, a second security context with the network service.

As another example, a non-transitory computer-readable medium is provided. The non-transitory computer-readable medium includes stored thereon instructions that, when executed by a processor system, cause the processor system to: transmit, to the network service, a service access request; establish, based on the service access request, a first security context with the network service; receive a first temporary device identifier (TUID) and a first temporary service identifier (TSID) for the network service; transmit a service resume message to an identity and routing service, the service resume message including the first TUID and the TSID for the network service; and establish, based on the service resume message, a second security context with the network service.

In another example, an apparatus for wireless communications with a network service of a wireless network is provided. The apparatus includes: means for transmitting, to the network service, a service access request; means for establishing, based on the service access request, a first security context with the network service; means for receiving a first temporary device identifier (TUID) and a first temporary service identifier (TSID) for the network service; means for transmitting a service resume message to an identity and routing service, the service resume message including the first TUID and the TSID for the network service; and means for establishing, based on the service resume message, a second security context with the network service.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
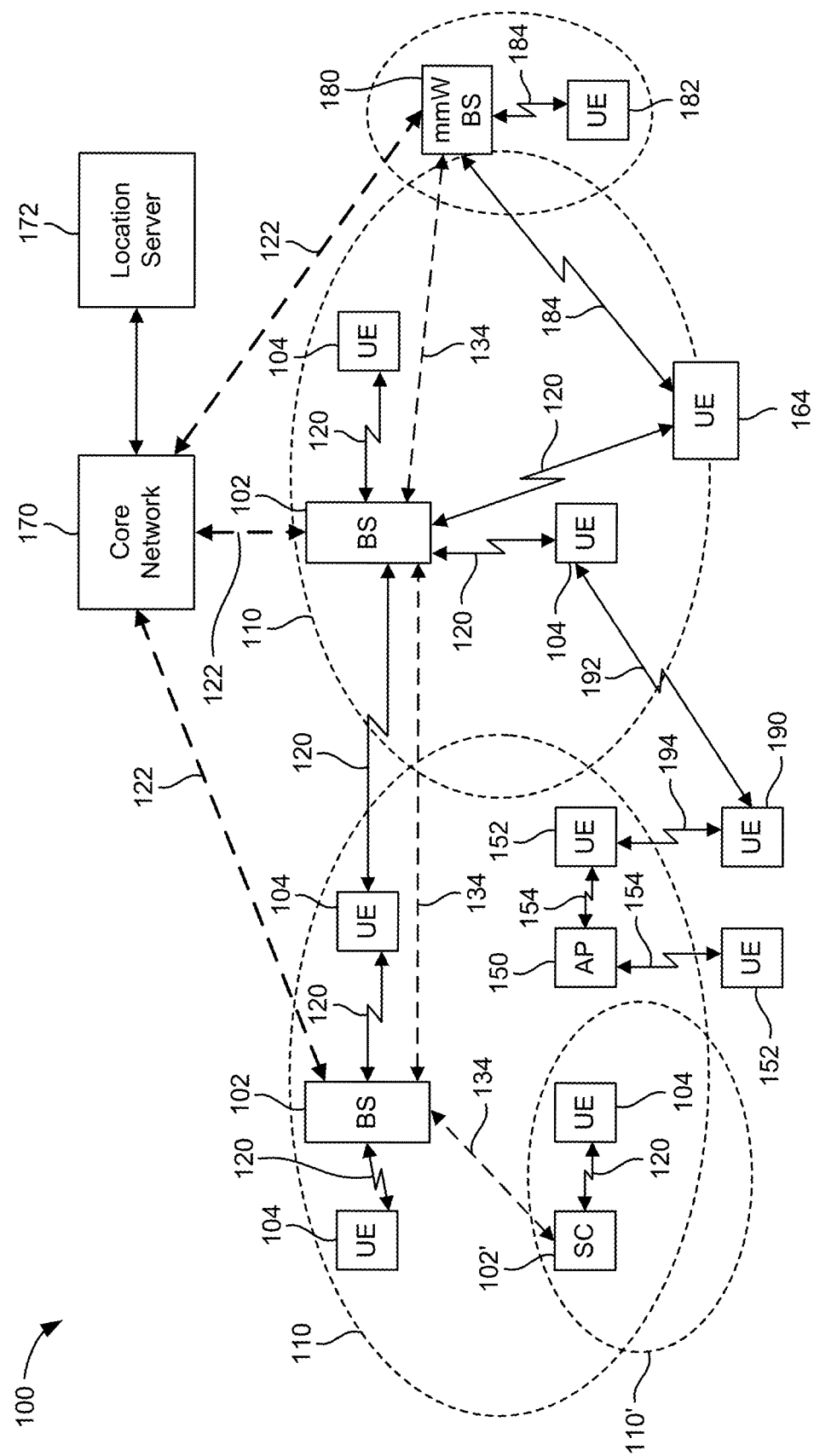
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3$^{rd}$ Generation Partnership Project (3GPP) gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

Various systems and techniques are provided with respect to wireless technologies (e.g., The 3GPP 5G/New Radio (NR) Standard, 6G, etc.) to provide improvements to wireless communications. A device (e.g., a UE, wireless device, mobile device, etc.) can be configured to access a wireless network (e.g., wireless system) to communicate with other devices. As a part of accessing the wireless network, the device may be configured to communicate with services separately without communicating with an intermediate entity. For example, various features provided by the wireless system may be implemented as separate services and the device may communicate directly with these services. While a device may access the service with a service identifier for the service, the service identifier may reveal some information about the device, depending on the service the device is trying to reach. For example, if the device attempts to contact a public safety/governmental service (e.g., associated with police, fire, military, etc.) then it may be inferred that the device is associated with emergency services, government, etc. It may then be possible to identify and/or track such devices based on the services accessed by those devices by seeing which devices attempt to access such services and attempting to obtain other identifiers associated with such devices. Similarly, the security context ID may be used to track a device if the security context ID is not adequately refreshed/reallocated by the service.

Systems, apparatuses, processes (also referred to as methods), and computer-readable media (collectively referred to as "systems and techniques") are described herein for maintaining privacy with respect to a service the device is attempting to access. For example, a service may be assigned a temporary service ID (TSID) that may be used instead of the service identifier (e.g. service ID or SID). In some cases, a service identity management entity, such as an identity and routing (IDR) service, may be used to provide services with respect to TSIDs. For example, the IDR service may maintain a mapping table of service IDs to issued TSIDs and the IDR service may provide a routing service by translating TSIDs to service IDs. In some cases, the IDR may also allocate TSIDs to services, for example to allow for easier TSID collision detection. In some examples, the TSIDs allocated to a service may be refreshed/reallocated.

In some cases, as wireless devices may have a relatively limited amount of power, the wireless devices may enter a low power mode (e.g., idle mode, inactive mode, sleep mode, etc.) to conserve power. While in the low power state, the wireless device may monitor for paging messages from the wireless service during a set of paging occasions. When a service the device is subscribed to has information for the device, the service may attempt to page the device using the paging identifier assigned to the device by the service. If services were allowed to individually page the device, the device may have to monitor multiple paging occasions that correspond to different services and are associated with the respective paging identifiers. Instead, it may be useful to have a single paging service that may coordinate paging the device so that the device can monitor a single paging occasion for multiple services.

In some cases, the device may directly connect with the paging service. In such cases, the device may establish a security context with the paging service. The paging service may assign the device a paging identifier. Services that are trying to page the device may send, to the paging service, an identifier for the device. In some cases, the services may also send the TSID associated with the service. The paging service may then page the device during a single paging occasion for all of the services. The paging service may page the device based on the paging identifier. Where multiple services are associated with a single paging identifier, the paging service may include the TSID associated with the service. The device may then perform a service resume with the service based on the page.

In some cases, the device may not directly connect with the paging service. In such cases, the service may obtain a paging identifier from the paging service for the device. The service may then provide the paging identifier to the device over a secure connection with the device. Services that are trying to page the device may send, to the paging service, an identifier for the device. In some cases, the services may also send the TSID associated with the service. The paging service may then page the device during a single paging occasion for all of the services. The paging service may page the device based on the paging identifier. Where multiple services are associated with a single paging identifier, the paging service may include the TSID associated with the service. The device may then perform a service resume with the service based on the page.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHZ)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHZ (e.g., 5, 10, 15, 20, 100 MHZ) bandwidth per carrier up to a total of Yx MHZ (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHZ), compared to that attained by a single 20 MHZ carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
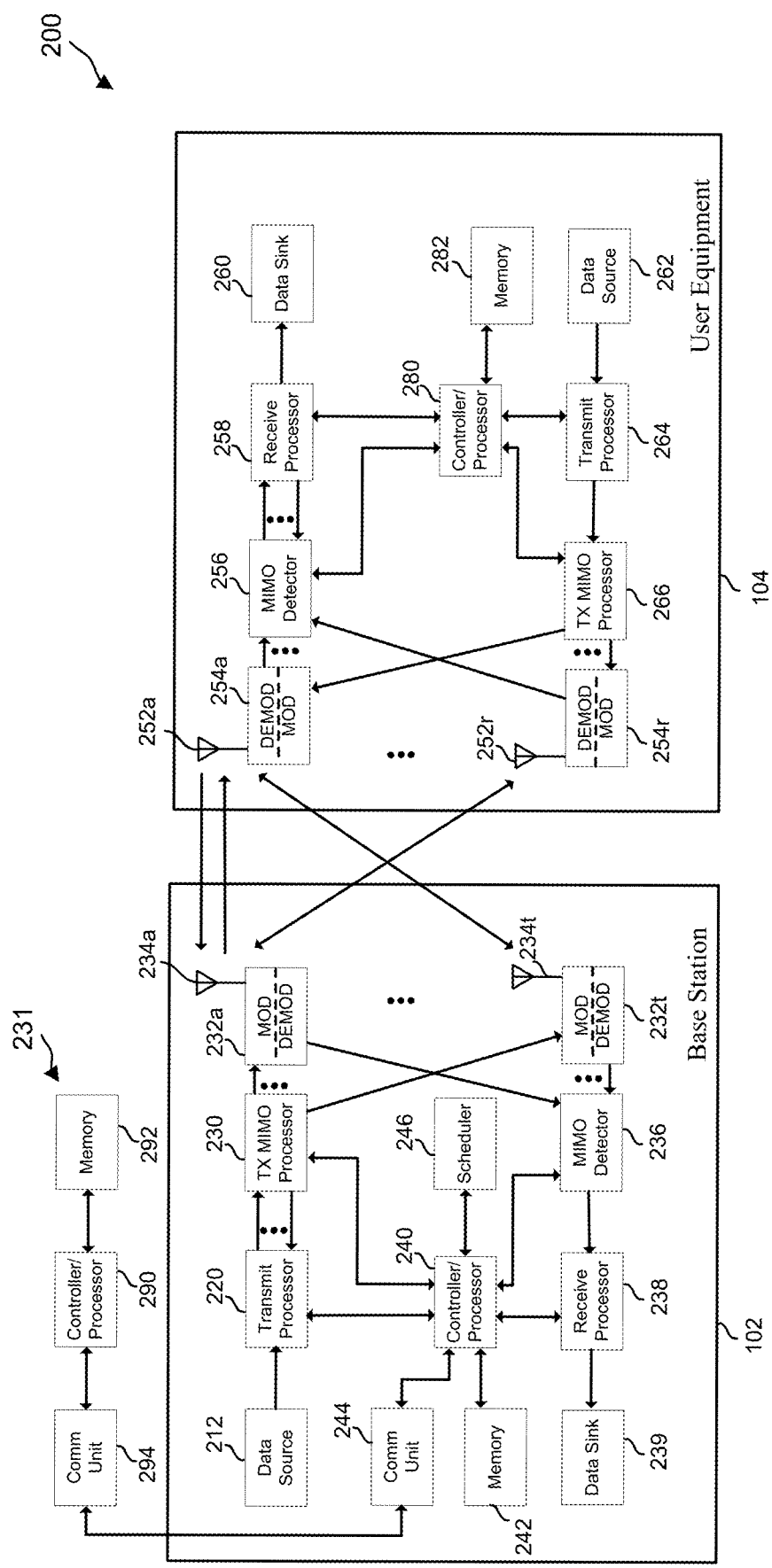
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, channel state information, channel state feedback, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, channel state information, channel state feedback, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit uplink control information (UCI) beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
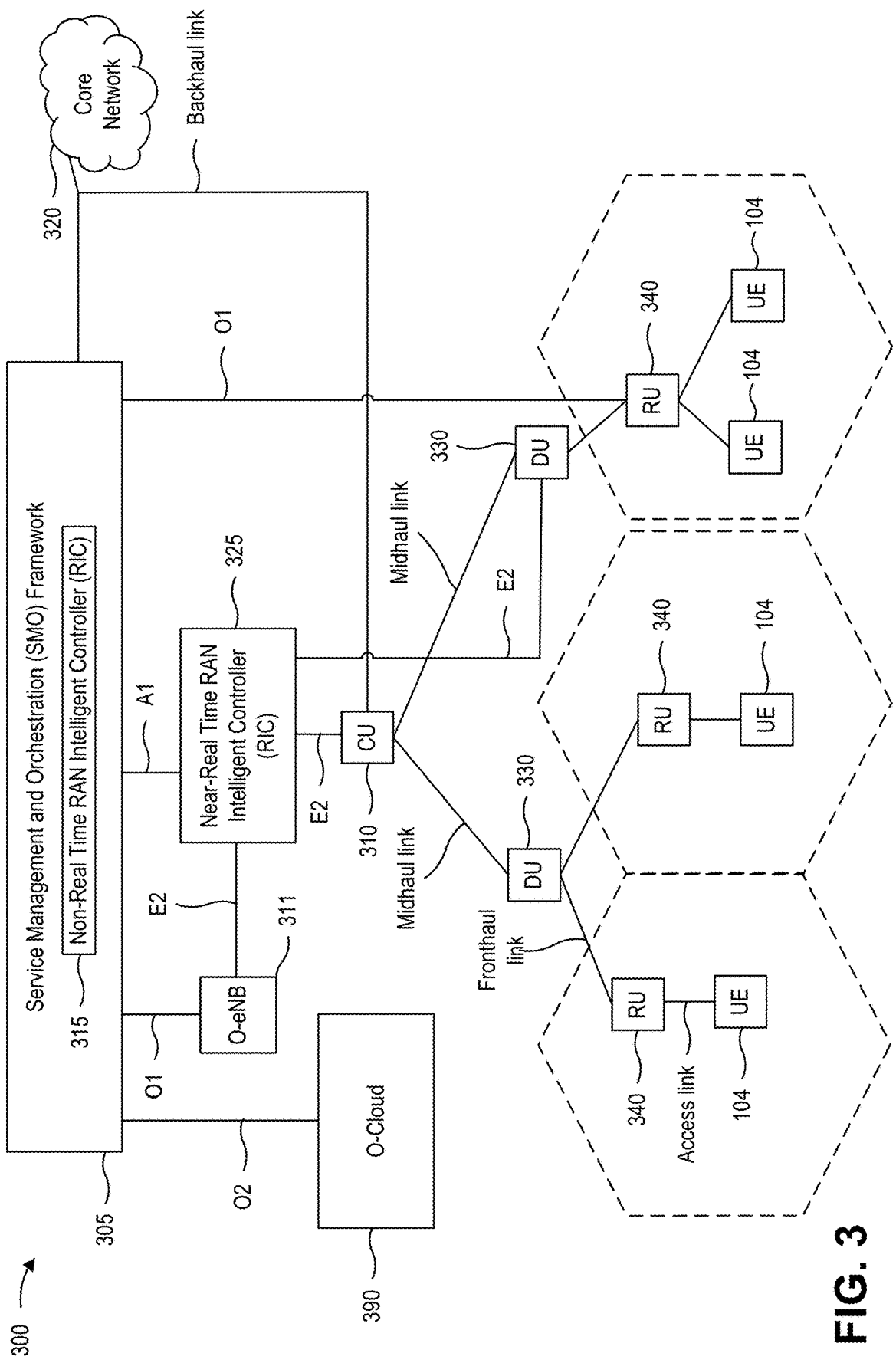
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUS 340 and Near-RT RICs 325. In some implementations, the SMO Framework 305 may communicate with a hardware aspect of a 4G RAN, such as an open eNB (O-cNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
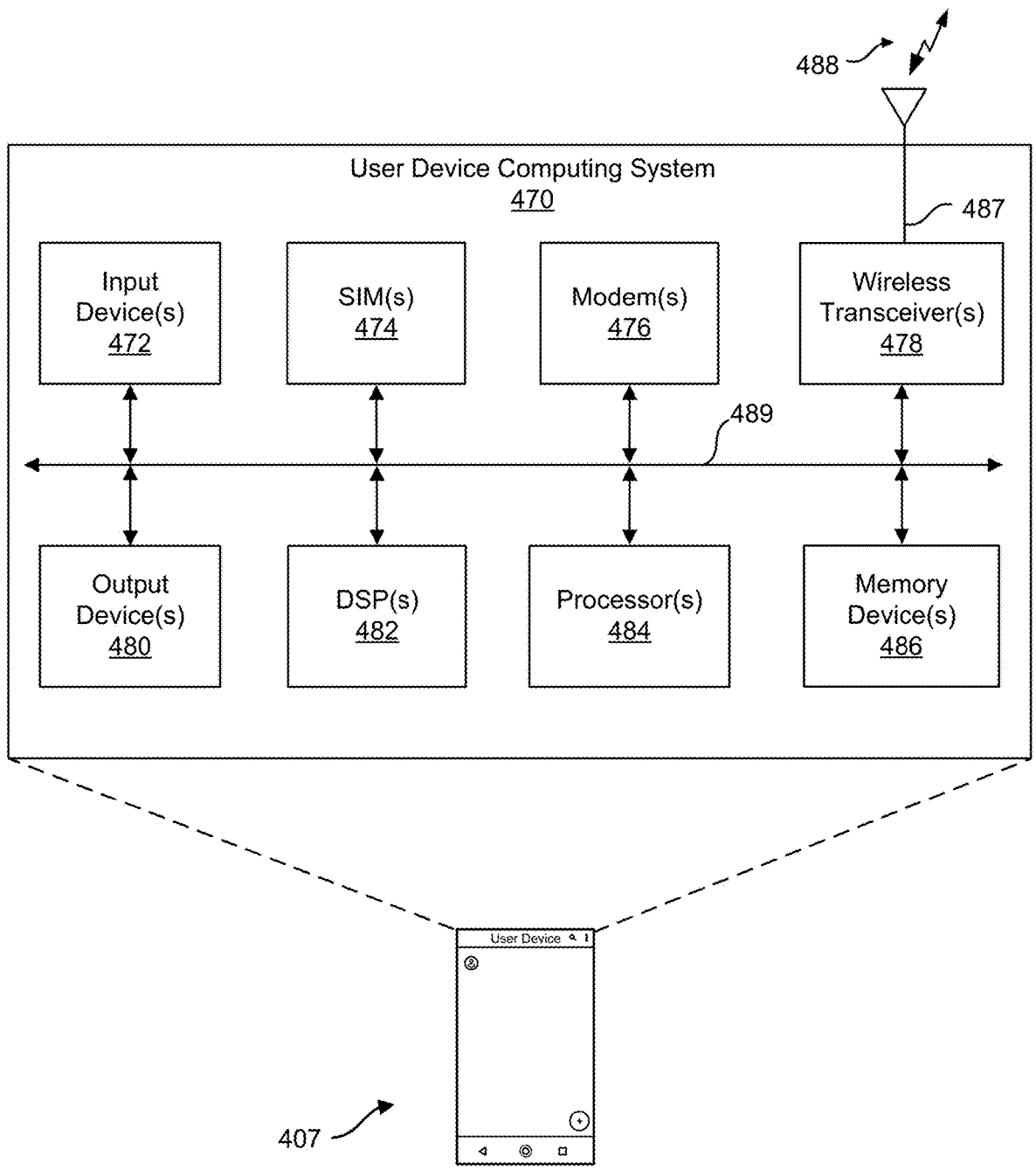
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

In some previous wireless systems, multiple security contexts exist on layer basis and multiple services (e.g., network services or services provided by the wireless system) may exist with a single security context. For example, a security context, that is a result of an authentication procedure to establish cryptographically secured communication between two elements, may be established between a mobile device, such as a UE, and a core network (e.g., a non-access stratum (NAS) security context between a UE and an access and mobility management function (AMF)). This NAS security context may anchor other security contexts as other security contexts may build on the NAS security context. Another security context (e.g., access stratum (AS) security context) may also be established based on the NAS security context through the AMF. Additional application specific security context may then be established via the connection through the AS security context. In some cases, it may be useful to separate the security contexts from the NAS security context so that the additional security contexts above the NAS are not all dependent on the secure connection between the mobile device and the AMF. Additionally, having separate security contexts for services may streamline implementation of additional services without having to make sure the AMF supports any security features of the additional services.

Figure 5:
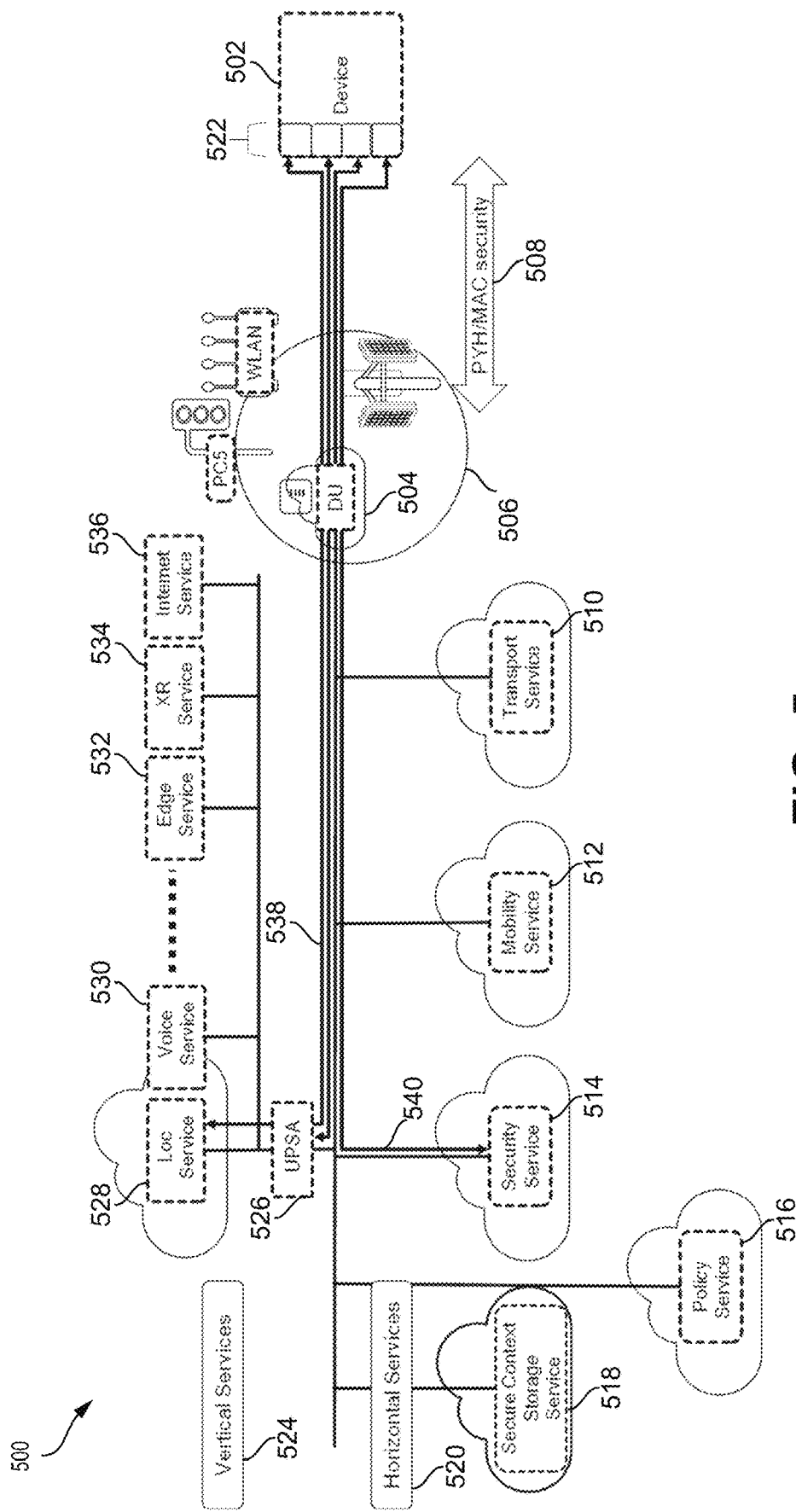
FIG. 5 is a diagram of a security architecture of a wireless system, according to aspects of the disclosure.

FIG. 5 is a diagram of a security architecture of a wireless system 500, according to aspects of the disclosure. In some cases, it may be useful to define a per service security context, for example, allow a service to tailor the security between the mobile device and the service. Wireless system 500 includes a device 502, which may be UE. The device 502 may be coupled to the wireless system 500 via a DU 504. In some cases, the connection between the device 502 and the DU 504 may be secured based on a physical layer and/or medium access control layer security 508. While a disaggregated base station 506 is shown in FIG. 5, it may be understood that any base station/access node design may be used, such as an eNodeB, gNodeB, aggregated/monolithic base station, Wi-Fi access point, and the like.

In some cases, allowing a per-service security context allows a device 502 to establish security context with specific services that are being used by the device 502, including for network services that would previously fall under core network services, such as, for example, a mobility service 512, transport service 510, and the like. In some cases, services of a wireless system 500 may be divided into different types of services. For example, basic services and commonly used services of a wireless system 500 (e.g., similar to those services traditionally provided by a core network of a wireless system, such as routing and handing over the device 502 from base station to base station) may be referred to as horizontal services 520, shown here on a lower portion of FIG. 5. For example, the transport service 510, mobility service 512, security service 514, policy service 516, secure context storage service 518, paging service (not shown) and the like may be considered horizontal services 520. Higher level network services which are more likely to be user facing (e.g., user plane applications) and more likely to be user specific may be referred to as vertical services 524. Examples of vertical services 524 include location services 528, voice services 530, edge services 532, XR services 534, internet services 536, and the like. In some cases, a user plane security anchor (UPSA) 526 service may provide general transport security between the device 502 and vertical services 524 and the UPSA 526 may support multiple services. In some cases, where the UPSA 526 is located in the network (e.g., near the edge of the network or closer to the core network) may be flexible. For example, the UPSA 526 may be co-located at the DU 504 or located closer to the vertical services 524 being supported (e.g., co-located with the vertical services 524).

In some cases, a user plane security anchor (UPSA) 526 service may provide general transport security between the device 502 and vertical services 524. For example, the UPSA 526 may expand on functionality provided by a packet data convergence protocol layer (PDCP) of a 5G NR wireless system and may be used to anchor (e.g., terminate) the user plane security and/or access stratum security for vertical services 524 of the wireless system 500. In some cases, the UPSA 526 may support multiple services. In some cases, where the UPSA 526 is located in the network (e.g., near the edge of the network or closer to the core network) may be flexible and may vary based, for example, on what services may be supported or provided by the wireless system 500 and the device. For example, the UPSA 526 may be co-located at the DU 504, located within cloud services (e.g., user plane functions), located closer to the vertical services 524 being supported (e.g., co-located with the vertical services 524), and so forth. As an example, if the UPSA 526 is co-located at the DU 504 and terminates the user plane security at the DU 504, then the UPSA 526 may change (and associated service security keys may be changed) if the device 502 is mobile and moves to another DU/gNodeB/eNodeB. This may not be a concern for services for less mobile devices, such as IoT devices, but may be a concern for more mobile devices. In some cases, multiple UPSA 526 may be used, for example, depending on capabilities and/or requirements of the services supported, security requirements and/or policies of the network and/or location of the transport service 510 termination point. In some cases, the transport service 510 may control the UPSA 526 and the transport service 510 may be updated with the location(s) of the UPSA 526. The transport service 510 may then derive and/or provision certain service security keys to certain UPSAs 526 based on, for example, relative location of the UPSA 526 with respect to the service being accessed. In some cases, the UPSA 526 may be implemented as a service and a service security context between the device 502 and the UPSA 526 may be established for user plane service security.

In some cases, the device 502 may include multiple security contexts 522 where each security context is established with a specific service being used. For example, the device 502 may have a first security context 540 with the security service 514 and the device 502 may also have a second security context 538 with the location services 528. In some cases, the security service 514 may provide security services for the device 502 along with other network functions. For example, the security service 514 may help establish security contexts (e.g., establish authentication keys) as between other services and the device 502. In some cases, these security contexts may then be stored in the secure context storage service 518. Other services may then access the secure context storage service 518 to retrieve stored security contexts. Thus, the security service 514 may anchor security establishment between the device 502 and services of the wireless system 500. As an example, a service, such as the mobility service 512, may request a security context from the security service 514. The security service 514 may respond to the mobility service 512 a security key and this security key may be stored in the secure context storage service 518 for later use by the mobility service 512 as needed.

In some cases, some services previously associated with a wireless node (e.g., gNodeB, DU, CU, etc.) may also be implemented as one or more horizontal services. For example, radio resource management, previously performed by a CU/gNodeB, may be implemented as a service (e.g., horizontal service 520) in a cloud.

Figure 6:
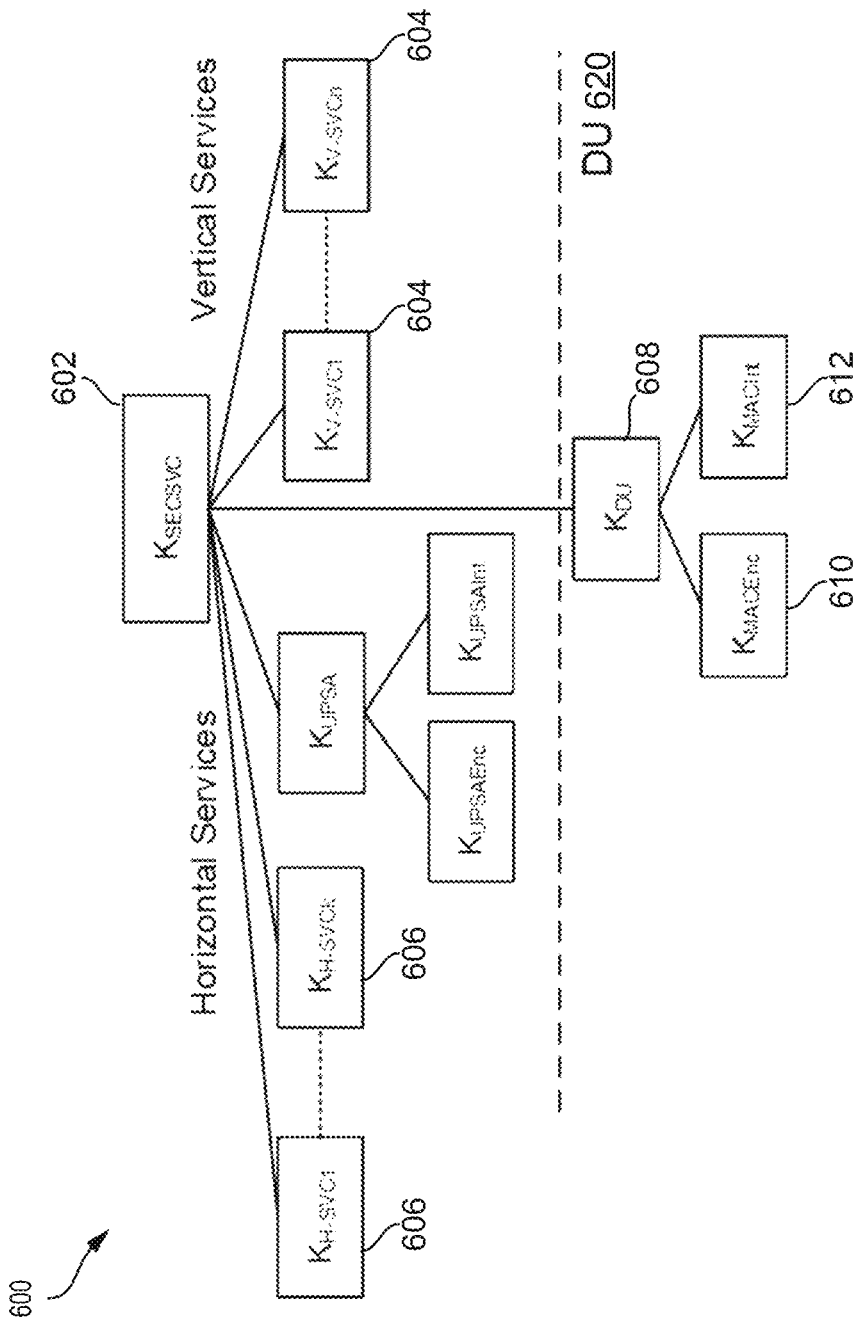
FIG. 6 is a tree diagram illustrating an encryption key hierarchy for services of a wireless system, such as the wireless system, in accordance with aspects of the present disclosure.

FIG. 6 is a tree diagram illustrating a key hierarchy 600 for services of a wireless system, such as the wireless system 500, in accordance with aspects of the present disclosure. In some cases, a device, such as device 502 of FIG. 5, may perform primary authentication and agree on a cryptographic key $K_{SECSVC}$ 602 (e.g., root key) with a security service, such as security service 514 of FIG. 5, as a part of establishing a connection with the wireless system. For example, the device may perform an authentication and key agreement (AKA) procedure with the security service and generate the root key. In some cases, additional cryptographic keys for other services provided by the wireless system may be derived based on the root key. For example, the security service may derive service keys for vertical services (e.g., $K_{V-SVC1}$-$K_{V-SCn}$) 604 based on the root key $K_{SECSVC}$ 602. The security service may also derive service keys for some horizontal services (e.g., $K_{H-SVC1}$-$K_{H-SVCk}$) 606 based on the root key $K_{SECSVC}$ 602. Communications between the device and a vertical service and/or certain horizontal services may then be based on the service key (e.g., without having to go through the security service unless a new service key is needed). As the network service may directly establish a security context with the device, security may be established directly between the device and the respective service without an ongoing dependency (e.g., such as by having the security service maintain a separate security context) to other services. In some cases, multiple root keys may be established based on a successful authentication and key agreement procedure. Each root key may correspond to a different network, and the network may be any type of network, such as a home network, a visited network, a logical network, a physical network, any combination thereof, and the like. Network specific root keys may be derived from the root key established between the device and the home network.

In some cases, a DU service key $K_{DU}$ 608 for use between the DU 620 and the device may also be derived based on the root key $K_{SECSVC}$ 602. In some cases, the DU 620 may be considered as another service of the wireless system. In some cases, the DU 620 may host other services, such as a MAC security and/or PHY security. The DU 620 may establish a DU specific key hierarchy for services hosted by the DU 620 to protect communications with the device. The MAC security and PHY security may be configured by the DU 620 and the key for MAC encryption $K_{MACEnc}$ 610 and key for MAC integrity $K_{MACInt}$ 612 may be derived from the DU service key $K_{DU}$ 608. In some cases, PHY security keys may be derived in a manner similar to MAC security key derivation.

Figure 7:
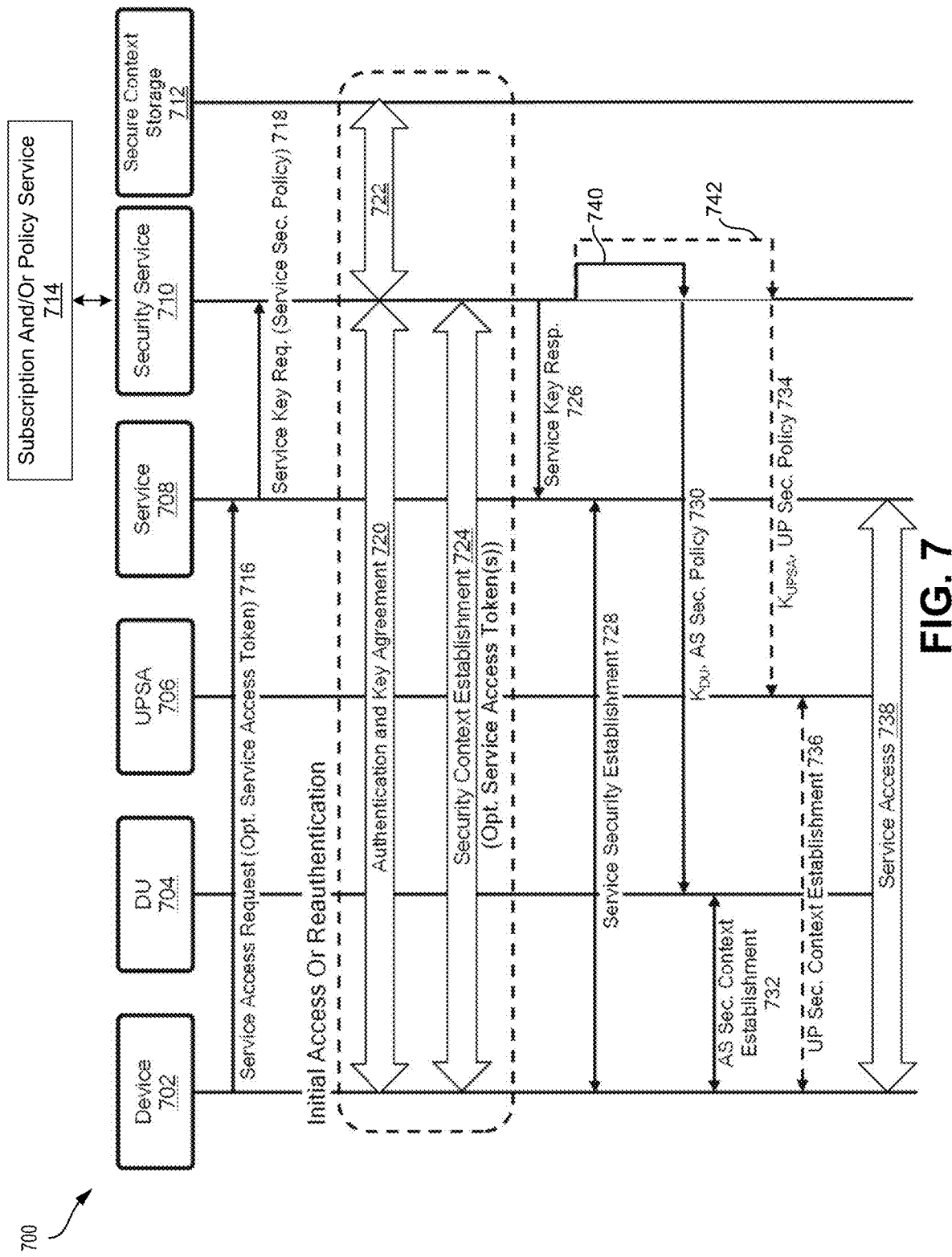
FIG. 7 is a call flow diagram illustrating a technique for securely accessing a service on a wireless system, in accordance with aspects of the present disclosure.

FIG. 7 is a call flow diagram illustrating a technique for securely accessing a service on a wireless system 700, in accordance with aspects of the present disclosure. The wireless system 700 illustrated in FIG. 7 includes a device 702, DU 704, UPSA 706, service 708, security service 710, and secure context storage 712. The device 702 may be substantially similar to device 502 of FIG. 5, DU 704 may be substantially similar to DU 504 of FIG. 5, UPSA 706 may be substantially similar to UPSA 526 of FIG. 5, service 708 may be any horizontal or vertical service except the security service 710 and secure context storage 712, security service 710 may be substantially similar to security service 514 of FIG. 5, and the secure context storage 712 may be substantially similar to the secure context storage service 518 of FIG. 5. In roaming scenarios, the service 708 may be a security service in the roaming network.

In some cases, when the device 702 attempts to establish a connection with a user plane service (such as service 708) of the wireless system, the device 702 may send a service access request 716 to the service 708 of the wireless network. In some cases, the service access request may be secured (e.g., encoded) based on a derived service access key. In some cases, the service access request 716 may include a service access token (e.g., if the device 702 previously established a security context with the security service 710 and obtained service access tokens). In some cases, a service access token may be provided to the device in response to the service access request to the security service. The device may then send this service access token to the service, for example, in the service access request to the service. The service may obtain the service key and decode the service access request to obtain the service access token. The service access token may include authorization information for accessing the service by the device. Based on the authorization information, the service may perform services for the device.

In some cases, the service access request may include a temporary identifier of the device 702, such as a globally unique temporary identifier (GUTI) or context identifier (context ID) of the device 702 attempting to access the service 708. The service access request may also include a service identifier for the service 708. Based on the received service access request 716, the service may transmit 718 a service key request and provide any service specific service security policy to the security service 710. For example, the service may transmit 718 a service specific security policy and, if the service 708 uses AS security, AS security activation status information indicating whether AS security is activated. In some cases, the service key request may include an identifier for the service and/or the temporary identifier for the device 702.

The service security policy may indicate what kind of security may be used, such as whether UPSA security should be used. The service security policy may also indicate where the UPSA 706 for the service 708 is/should be located.

In cases where the device 702 has not previously established a security context with the service 708 or is performing a reauthentication procedure, the device 702 and security service 710 may perform authentication and key agreement procedure 720 using, for example, an authentication and key agreement protocol, to generate a session root key between the device 702 and security service 710. For example, the device 702 and security service 710 may perform authentication and key agreement procedure 720 using, for example, an authentication and key agreement protocol, to generate a session root key between the device 702 and security service 710. In some cases, the authentication and key agreement procedure 720 may use a long-term credential type authentication and key agreement protocol such as 6G AKA, Extensible Authentication Protocol Method for 3rd Generation Authentication and Key Agreement (EAP-AKA or EAP-AKA'), and the like. The session root key may be stored 722 in the secure context storage 712. The secure context storage 712 may be implemented as a service and separated from the security service 710. The secure context storage 712 may not be exposed (e.g., visible) to other services and/or the device 702. In some cases, the secure context storage 712 may be accessible through the security service 710, for example, by requesting a stored service key.

In some cases, the session root key may be used to establish a main security context 724 (e.g., perform a security context establishment procedure) between the device 702 and the security service 710. Establishing the main security context 724 may be performed using a service establishment protocol such as a NAS security mode command procedure, a transport layer security (TLS) service establishment protocol, and the like. Once the main security context 724 is established, further communications between the device 702 and the wireless service may be based on the main security context.

In some cases, the security service 710 may provide the device 702 one or more service access tokens. In some cases, if the security context was previously established with the security service 710 (e.g., where a valid access token was provided with the service access request 716), the authentication and key agreement procedure 720, storing 722 the session root key, and establishing the security context 724 with the security service 710 may be skipped.

The security service 710 may respond 726 to the service key request 718 by transmitting a service key response 726 to the service 708. In some cases, the security service 710 may also transmit UE security capability information to the service 708 in the service key response 726. The service 708 may use the service key from the security service 710 to decrypt the service access request transmitted 716 from the device 702. If the service access request included the service access token, the service 708 may obtain the service access token. The service 708 may then establish 728 a service specific security context with the device 902 based on the service key.

In cases where AS security is used, the security service 710 may derive 740 an AS key $K_{DU}$ that may be used to establish (or refresh) the AS security context as between the device 702 and the DU 704 based on the service security policy and AS security activation status information received from the service 708 in the service key request 718. In some cases, the AS key $K_{DU}$ (e.g., $K_{DU}$ 608 of FIG. 6) may be derived from the session root key (e.g., $K_{SECSVC}$ 602), DU identifier, and service identifier in a manner similar to that described above with respect to FIG. 6. In some cases, the AS key $K_{DU}$ may be derived using the key derivative function along with the session root key (e.g., $K_{SECSVC}$ 602), DU identifier, service identifier, and a freshness parameter. The DU identifier may be any identifier for the DU 704, such as an identifier number, IP address, etc. Similarly, the service identifier may be any identifier for the service 708.

In some cases, the security service 710 may transmit 730 the derived AS key $K_{DU}$ to the DU 704 along with the AS security policy. In some cases, the AS security policy may be obtained based on the service security policy. In other cases, the AS security policy may be obtained by the security service 710 from a subscription and/or policy service 714 accessible to the security service 710. The DU 704 may then establish an AS security context 732 between the device 702 and the DU 704 based on the AS security policy and the AS key $K_{DU}$. As an example, the DU 704 may configure a new bearer for the service 708 based on the AS security policy.

In some cases, based on the service security policy, the service 708 may also establish a user plane security context 736. In such cases, the security service 710 may derive 742 a UPSA key $K_{UPSA}$ (shown in FIG. 7 as UPSA key $K_{UPSA}$, user plane security policy 734) that may be used to establish (or refresh) the user plane security context 736. In some cases, the UPSA key $K_{UPSA}$ (e.g., $K_{UPSA}$ 614 of FIG. 6) may be derived from the session root key (e.g., $K_{SECSVC}$ 602) and UPSA identifier as described above with respect to FIG. 6. In some cases, the UPSA key $K_{UPSA}$ may be derived using the key derivative function along with the session root key (e.g., $K_{SECSVC}$ 602), UPSA identifier, service identifier, and a freshness parameter. The UPSA identifier may be any identifier for the UPSA 706, such as an identifier number, IP address, etc. Similarly, the service identifier may be any identifier for the service 708. In some cases, the freshness parameter may be a random number. The freshness parameter may be chosen, for example, by the security service 710, and the freshness parameter may be indicated to the device 702 by the UPSA 706 during establishment of the UPSA user plane security context 736.

The security service 710 may then transmit 738 the UPSA key $K_{UPSA}$, user plane security policy 734, and service identifier to the UPSA 706. In some cases, such as if the user plane security has already been established, the UPSA key $K_{UPSA}$ may be omitted as the UPSA 706 and device 702 already have the UPSA key $K_{UPSA}$. In some cases, the security context between the UPSA 706 and the device 702 may be established in a manner similar to establishing 728 a security context between the device 702 and the service 708. Access 738 to the service 708 via the UPSA 706 may then be performed.

In some previous wireless systems, privacy as between a device and the wireless system was maintained when initial connecting to the wireless system by encrypting a device's permanent identity (subscriber permanent identifier, SUPI) using a public key of the wireless system. The wireless system may then generate a GUTI for the device and use the GUTI for communicating with the device. This GUTI may be reallocated frequently to avoid possibly linking the device to the GUTI. For example, the GUTI may be reallocated after a paging event, after receiving a service request, and/or after a certain amount of time. In some previous wireless systems, device privacy, such as decrypting the encoded SUPI, generating the GUTI, reallocating the GUTI, etc., may be handled by a single entity, such as an access and mobility management function (AMF). However, in a service-based security architecture, such as in wireless system 500 of FIG. 5, a device may communicate with services separately without communicating with an intermediate entity, such as an AMF. For example, where a device attempts to resume access to a service (e.g., after exiting a lower power mode or inactivity mode), the device may send a service access request message to one or more services. As indicated above, the service access request may include a service ID and/or context ID for the service. In some cases, the service ID may reveal some information about the device or the user of the device, depending on the service the device is trying to reach. For example, if the device attempts to contact a public safety/governmental service (e.g., associated with police, fire, military, etc.) then it may be inferred that the device is associated with emergency services, government, etc. Similarly, the security context ID may be used to track a device if the same security context ID is used repeatedly without being refreshed/reallocated by the service.

In some cases, it may be useful to maintain privacy for accessing services, for example, by using enhanced paging services with identity management. To help maintain privacy when a device accesses a service, the service may assign the device a temporary identifier, such as a security context identifier or GUTI. This temporary identifier, also known as a temporary UE ID (TUID) (e.g., temporary device identifier), may be allocated by the service during service security establishment/reestablishment and multiple TUIDs may be allocated per device by a service, depending on the service security policy. Different services may each assign the device a different TUID. In some cases, a device may contact the service with the assigned TUID and the service may identify the device based on the TUID.

To help maintain privacy with respect to a service the device is attempting to access, services may be assigned a temporary service ID (TSID) that may be used instead of the service ID. In some cases, a service identity management entity, such as an identity and routing (IDR) service, may be used to provide services with respect to TSIDs. For example, if services were allowed to allocate TSIDs, it may be difficult for a wireless system to determine which service to route packets to absent a service to provide mapping and/or routing services. Thus, the IDR service may maintain a mapping table of service IDs to issued TSIDs and the IDR service may provide a routing service by translating TSIDs to service IDs. In some cases, the IDR may also allocate TSIDs to services, for example to allow for easier TSID collision detection. Alternatively, services may allocate TSIDs and register allocated TSIDs with the IDR service. During the TSID registration, the IDR service may check for conflicts of TSIDs. In some cases, each device accessing a service may receive the same TSID for the service. In other examples, multiple TSIDs may be allocated per service and the service may determine how to allocate TSIDs to the devices. For example, the service may, in a service request, request a number of TSIDs and the IDR service may allocate the number of TSIDs for use by the service. The service may then randomly select a TSID from the batch of TSIDs and provide the selected TSID to one or more devices accessing the service. In some examples, the TSIDs allocated to a service may be refreshed/reallocated and this refresh/reallocation of the TSIDs may be performed based on a schedule, based on a number of times a TSID is assigned to (e.g., associated with) a device, periodically, based on a number of devices to which the TSID is assigned, or any other mechanism which may cause TSIDs to be refreshed/reallocated. In some cases, the IDR service may be a horizontal service (e.g., of horizontal services 520 of FIG. 5) of a wireless system. In some cases, the IDR service may be collocated with a mobility service (e.g., mobility service 512 of FIG. 5) of the wireless system. In some cases, the IDR service may be an independent service or integrated with another service, such as the mobility service.

Figure 8:
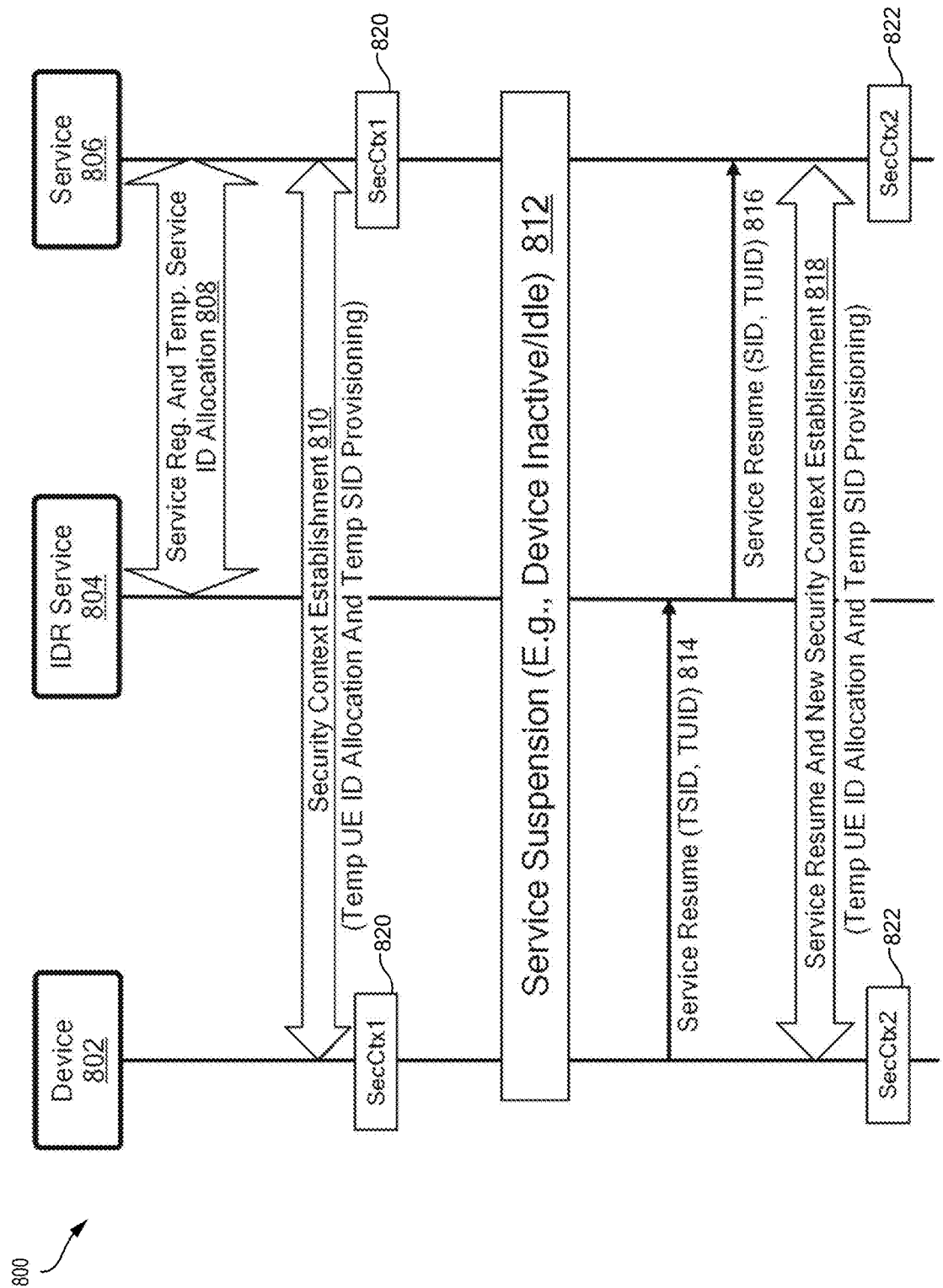
FIG. 8 is a call flow diagram illustrating a technique for privately accessing a service of a wireless system, in accordance with aspects of the present disclosure.

FIG. 8 is a call flow diagram illustrating a technique for privately accessing a service of a wireless system 800, in accordance with aspects of the present disclosure. The wireless system 800 illustrated in FIG. 8 includes a device 802, an IDR service 804, and service 806. The device 802 may be substantially similar to device 502 of FIG. 5 and device 702 of FIG. 7, and service 806 may be substantially similar to service 708 of FIG. 7. In some examples, the service 806, at step 808, may register with the IDR service 804 and one or more TSIDs may be allocated to the service 806, for example, by the IDR service 804. In some cases, the service 806 may register its service ID with the IDR service 804. The allocated TSIDs are stored by the IDR service 804 (e.g., in a mapping/lookup table of service IDs to 'TSIDs) and the IDR service 804 may provide the allocated TSIDs to the service 806. In some examples, the service 806 may transmit a service registration request to the IDR service 804. The service registration request may include the service ID. In some cases, the service registration request may include an indication of a number of TSIDs being requested. For example, the service 806 may indicate that it is requesting multiple TSIDs in the service registration request and the IDR service 804 may generate a number of TSIDs based on the indication. In some cases, the service 806 may perform step 808 and register with the IDR service 804 to obtain TSIDs when the service 806 is enabled/established (or as a part of setting up the service 806) in the wireless system.

In some cases, at step 810, as a part of establishing a service security context (e.g., service security context SecCtx1 820) between the device and the service 806, the service 806 may allocate a TUID to the device 802 and transmit the allocated TUID and the TSID allocated to the service 806, to the device 802. In some cases, the service security context SecCtx1 820 may be established in a manner similar to that described above with respect to FIG. 7 and service security establishment 728. The service security context SecCtx1 820 may be associated with the TUID and the TSID. After the service security context SecCtx1 820 is established, the device 802 may communicate with the service 806 without further exchanging the TUID and/or TSID (unless refreshed).

In some cases, at step 812, access to the service may be suspended. For example, the device 802 may enter an inactive/idle mode, or otherwise low power state. The service and may receive an indication that the device has entered the inactive/idle state the service 806 may remove (e.g., delete) the security context with the wireless device. In some cases, the service may partially remove the security context with the wireless device. For example, the service may partially remove the security context by removing the session specific security and/or context parameters from the security context SecCtx1 820. In some cases, the service 806 may receive the indication that the device has entered the inactive/idle state from the device 802, or another service of the wireless service.

In some cases, the device 802 may attempt to reestablish a connection with the service 806. For example, after the device 802 exits the low power state, the device 802 may, at step 814, transmit a service resume request to the service 806. The service resume request may include the TUID and TSID. The wireless network may receive the service resume request (e.g., by a DU/CU/cNB/gNB/etc.) and route the service resume request to the IDR service 804 to determine which service the service resume request is directed to. For example, a wireless node may receive the service resume request and forward the service resume request to the IDS service based on the request being a service resume request. The IDR service 804 may lookup the TSID (e.g., from a mapping/lookup table of service IDs to allocated TSIDs) from the service resume request to determine which service 806 the service resume request is directed to and then route the service resume request to the service 806 at step 816. In some cases, the TSID may be replaced by the service ID by the IDR service 804 for step 816, for example, if routing in the wireless system is based on the service ID. Based on the service resume request, the service 806 and device 802 may resume service and establish a new service security context SecCtx2 822 at step 818 based on the service security context SecCtx1 820 identified by the TUID. In some cases, a temporary security context may be established before the new security context SecCtx2 822 is established (not shown). As a part of establishing the new service security context SecCtx2 822, the service may allocate a new TUID to the device 802. In some cases, the service may also associate the device 802 with a new TSID (if available). For example, for a service 806 with relatively lower privacy concerns, the service 806 may not assign the device 802 a new TSID allocated to the service 806 (even if one is available). As another example, for a service 806 with relatively higher privacy concerns, the service 806 may have multiple TSIDs allocated to the service 806 and the service 806 may assign a new TSID to the device 802. The service 806 may then transmit the new TUID and TSID (if a new TSID is available and assigned) to the device 802.

Figure 9:
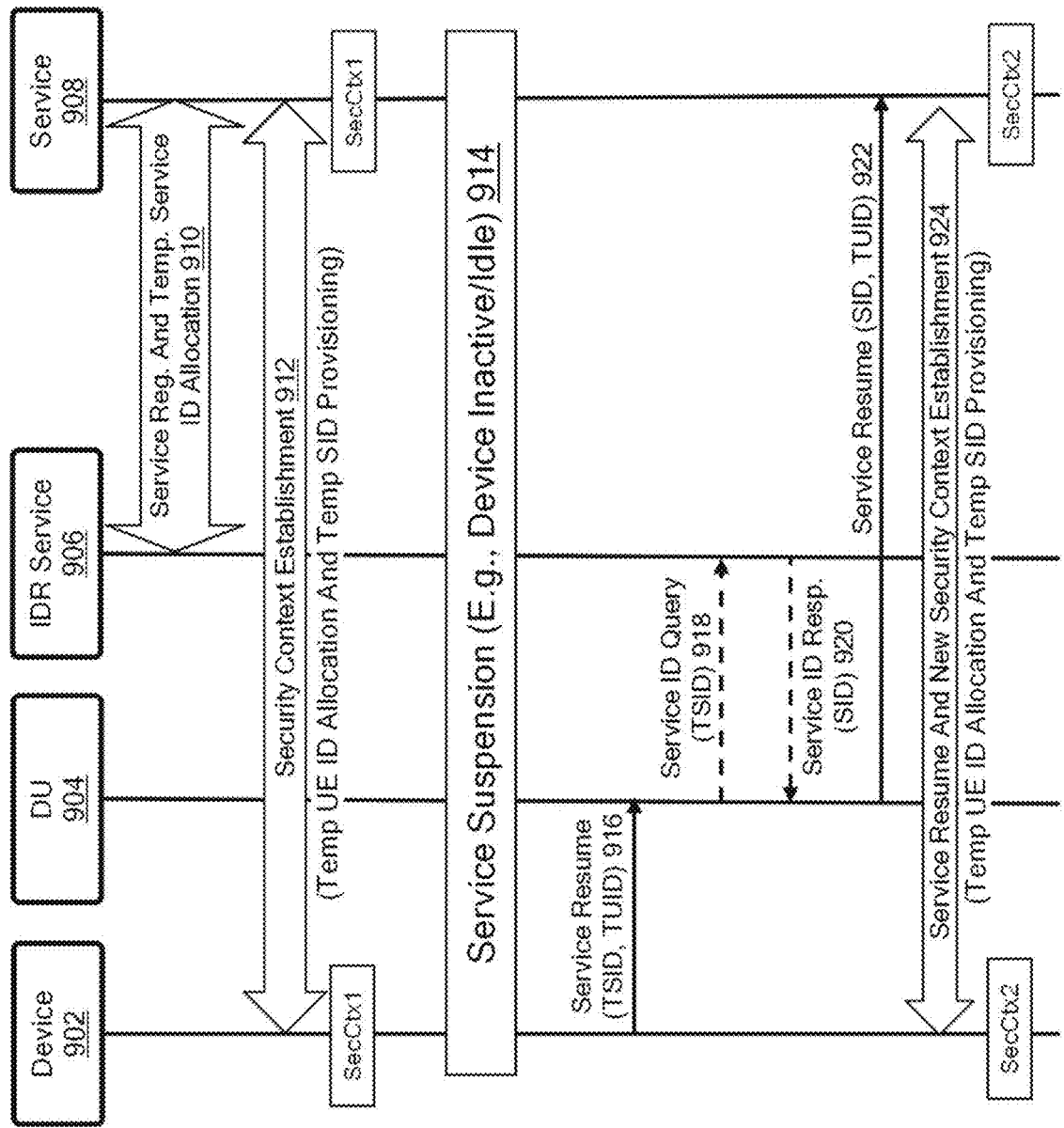
FIG. 9 is a call flow diagram illustrating another technique for privately accessing a service of a wireless system, in accordance with aspects of the present disclosure.

FIG. 9 is a call flow diagram illustrating another technique for privately accessing a service of a wireless system 900, in accordance with aspects of the present disclosure. The wireless system 900 illustrated in FIG. 9 includes a device 902, a DU 904, an IDR service 906, and service 908. The device 802 may be substantially similar to device 502 of FIG. 5, device 702 of FIG. 7, and device 802 of FIG. 8. The DU 904 may be substantially similar to DU 504 of FIG. 5 and DU 704 of FIG. 7. Service 908 may be substantially similar to service 708 of FIG. 7. In some examples, the service 908, at step 910, may register with the IDR service 906 and receive one or more allocated TSIDs in a manner substantially similar to that way as described above with respect to FIG. 8 and step 808. The service 908 may also establish a service security context at step 912 in a manner substantially similar to that way as described above with respect to FIG. 8 and step 810. Similarly, at step 914, access to the service may be suspended, and the service security context removed in a manner substantially similar to that discussed above with respect to step 812 of FIG. 8.

In some cases, the device 902 may attempt to reestablish a connection with the service 908. For example, after the device 902 exits the low power state, the device 902 may, at step 916, transmit a service resume request to the DU 904. The service resume request may include the TUID and TSID. In some cases, the DU 904 may be able to map some TSIDs to the appropriate service ID and/or service 908. For example, the DU 904 may include a mapping table between at least one TSID to a service ID of a service. In cases where the DU 904 is able to map the TSID of the service resume message sent from the device 902 at step 916 to service 908, the DU 904 may directly forward the service resume message to the service 908. In some cases, the mapping performed by the DU 904 may be relatively limited as compared to the IDR service 906. If the DU 904 is unable to map the TSID to a corresponding service 908, the DU 904 may, at step 918, send a service ID query to the IDR service 906. The service ID query may include the TSID from the service resume message sent from the device 902 at step 916. The IDR service 906 may send a service ID response at step 920 in response to the service ID query sent by the DU 904 at step 918. The service ID response may include the service ID corresponding to the TSID included in the service ID query. The DU 904 may then, at step 922, forward the service resume request to the service 908 based on the received service ID (SID). In some cases, a mapping between the TSID and SID may be stored at the DU 904 for future use. Maintaining a mapping of TSID to SID at the DU may be useful to help avoid frequent TSID resolution by the IDR service. In some cases, the TSID may be associated with a validity time period provided by the IDR service 906 and the DU 904 may remove the mapping of the TSID to SID based on the validity time period. In some cases, the IDR service 906, at step 920 may directly provide a network address (e.g., IP address) of the service 908, and the DU 904 may forward the service resume request to the service 908 based on the network address.

Alternatively, if the DU 904 is unable to map the TSID to a corresponding service 908, the DU 904 may forward the service resume message sent by the device 902 to the IDR service 906 in a manner substantially similar to that discussed above with respect to FIG. 8.

After the service resume message is received by the service 908, the service 908 and device 902 may, at step 924, establish a new service security context in a manner substantially similar to that discussed above with respect to step 818 of FIG. 8.

As suggested above, a device may have multiple TUIDs from multiple services (e.g., one from each service). In some cases, those TUIDs may be used for paging the device (e.g., if the service has information for the device). During a paging occasion, a device may exit a low-power mode and listen for paging messages. These paging occasions may be scheduled in advance. However, using multiple TUIDs for paging by multiple services may be difficult as the device may have to monitor too many paging occasions, possibly resulting in excessive battery consumption. Instead, paging for the services may be coordinated by a paging service for the wireless system.

In some cases, the paging service may be a horizontal service (e.g., horizontal services 520 of FIG. 5) of the wireless system. In some cases, the paging service may perform paging for other services. In some cases, the paging service may be separate from the mobility service (e.g., mobility service 512 of FIG. 5). In cases where the paging service is separate from the mobility service, a TUID for the paging service (e.g., as a paging ID) may be used for paging. A TSID may also be allocated to the paging service to use in place of the service ID of the paging service.

Figure 10:
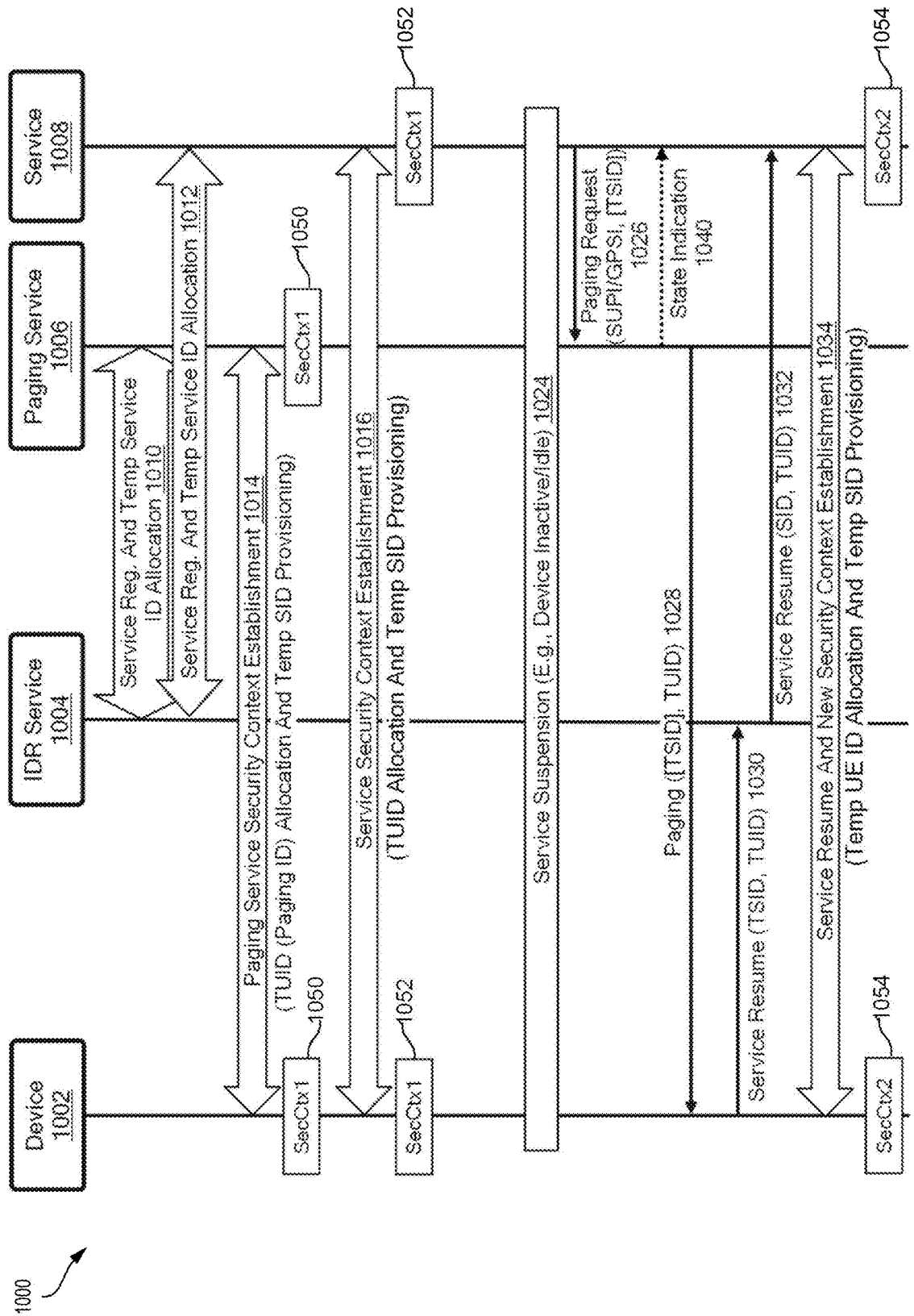
FIG. 10 is a call flow diagram illustrating paging in a wireless system where the device directly connects to a paging service, in accordance with aspects of the present disclosure.

FIG. 10 is a call flow diagram illustrating paging in a wireless system 1000 where the device directly connects to a paging service, in accordance with aspects of the present disclosure. The wireless system 1000 illustrated in FIG. 10 includes a device 1002, an IDR service 1004, paging service 1006, and service 1008. The device 1002 may be substantially similar to device 502 of FIG. 5, device 702 of FIG. 7, device 802 of FIG. 8, and device 902 of FIG. 9. The IDR service 1004 may be substantially similar to IDR service 906 of FIG. 9. Service 1008 may be substantially similar to service 708 of FIG. 7.

In some examples, the paging service 1006, at step 1010, may register with the IDR service 1004 and receive one or more allocated TSIDs in a manner substantially similar to that way as described above with respect to FIG. 8 and step 808. In cases where the paging service is collocated with the mobility service, the paging service 1006 may skip step 1010 and use a TSID of the mobility service. Similarly, the service 1008, at step 1012, may register with the IDR service 1004 and receive one or more allocated TSIDs in a manner substantially similar to that way as described above with respect to FIG. 8 and step 808.

In some cases, the device 1002, may also, at step 1014, establish a service security context 1050 with the paging service 1006. As a part of establishing the service security context 1050 with the paging service 1006, device 1002 may request a paging ID for services (e.g., service 1008) that the device 1002 is subscribed to. In some cases, the device may provide an existing paging ID from the paging service 1006 for another service. The paging service 1006 may allocate a new TUID (e.g., paging ID or paging TUID) as a paging ID, where the paging ID falls into a same paging occasion of the existing paging ID. If there are no existing paging IDs, a paging occasion may be selected and a paging ID that falls into the selected paging occasion used. The paging service 1106 may then send the allocated paging ID to the device 1002. The paging ID may be used by the device 1002 to monitor for paging. For example, the device 1002 may monitor for and respond to, during a paging occasion, paging messages directed at the paging ID. This paging ID may be a single paging ID (e.g., a new TUID) for all services, such as service 1108, or multiple paging IDs may be used, such as a per service paging ID or a paging ID shared by a number of services. In cases where the paging service is collocated with the mobility service and a single paging ID is used, the paging ID may be an existing TUID for the device 1002 associated with the mobility service.

In some cases, device 1002 may transmit to the paging service 1006, a list of TSIDs associated with services the device 102 is subscribed (e.g., accessing). In some cases, transmitting the list of TSIDs may be performed as a part of the security context establishment. The paging service 1006 may transmit this list of TSIDs to the IDR service and request the services, such as service 1008, the TSIDs are referring to. The paging service 1006 may send to the device 1002, a TSID of the TSIDs allocated to the paging service 1006.

The device 1002, at step 1016, may establish a service security context 1052 with the service 1008. In some cases, the service security context 1052 with the service 1008 may be established in a manner substantially similar to that way as described above with respect to FIG. 8 and step 810. As a part of establishing the service security context 1052, the device 1002 may receive an allocated TUID and TSID for (e.g., associated with) the service 1008.

In some cases, at step 1024, access to the service may be suspended, and the service security context 1052 may be removed by the service 1008. For example, the device 1002 may enter an inactive/idle mode, or otherwise low power state and the service and the service 1008 may remove the service security context 1052.

In some cases, the service 1008 may, at step 1026, page the device 1002, for example, when there is data for the device 1002. The service 1008 may page the device 1002, at step 1026, by sending a paging request message to the paging service 1006. In some cases, the paging request message may include a permanent identifier for the device 1002, such as a SUPI or a generic public subscription identifier (GPSI). In such cases, the paging service 1006 may have access to the permanent identifier for the device 1002. The paging request message may also include a TSID for the service (e.g., the TSID for the service 1008 sent to the device 1002 at step 1016). The paging service 1006 may determine, based on the permanent ID, the paging ID and TSID associated with the device 1002. During a paging occasion for the device 1002, the paging service 1006 may send, at step 1028, a paging message for the device 1002. The paging message may include the paging ID associated with the device 1002 and TSID for the service 1008. In cases where a single paging ID can be used with multiple services (e.g., where a single paging ID is used for all services), the paging message may include the paging ID associated with the device 1002 and TSID for the service 1008. Thus, the device 1002 may monitor for a single paging ID during one paging occasion for multiple subscribed services. In cases where a per service paging ID is used, the paging message may include the paging ID and the TSID may be omitted as the device 1002 may determine which service 1108 is paging the device 1102 based on the paging ID. In such a case, the device 1002 may monitor for a set of paging IDs during one paging occasion for multiple subscribed services. In some cases where per service paging ID is used, the paging ID and TSID may be included in the paging message as this may require less storage/processing for the device 1002.

After receiving the paging message, the device 1002 may attempt to reestablish a connection with the service 1008, at step 1030, by sending a service resume message. The service resume message may include the TSID associated with the service 1008 and the TUID for the device 1002 associated with the service 1008. The service resume message may be passed to the IDR service 1004 and on to the service 1008 in a manner similar to that described above with respect to steps 814 and 816 of FIG. 8. Alternatively, the service resume message may be passed to a DU and on to the service 1008 in a manner similar to that described above with respect to steps 916-822 of FIG. 9. Based on the service resume request, the service 1008 and device 1002 may resume service and establish a new service security context SecCtx2 1054, at step 1034, in a manner substantially similar to that described above with respect to step 818 of FIG. 8.

In some cases, when the service 1008 attempts to page the device 1002 at step 1026, the device 1002 may already be in a connected state (e.g., if another service previously paged the device 1002 and the device 1002 has connected to horizontal services of the wireless system to access the other service) and paging the device 1002 again may not be necessary. In such cases, the paging service 1006 may respond, at step 1040, to the paging request with a state indication message indicating that the device 1002 is already in the connected state. The service 1008 may then attempt to reestablish a connection and security context 1054 with the device 1002, at steps 1030, 1032, and 1034. In such a case, steps 1030 and 1032 may be omitted.

Figure 11:
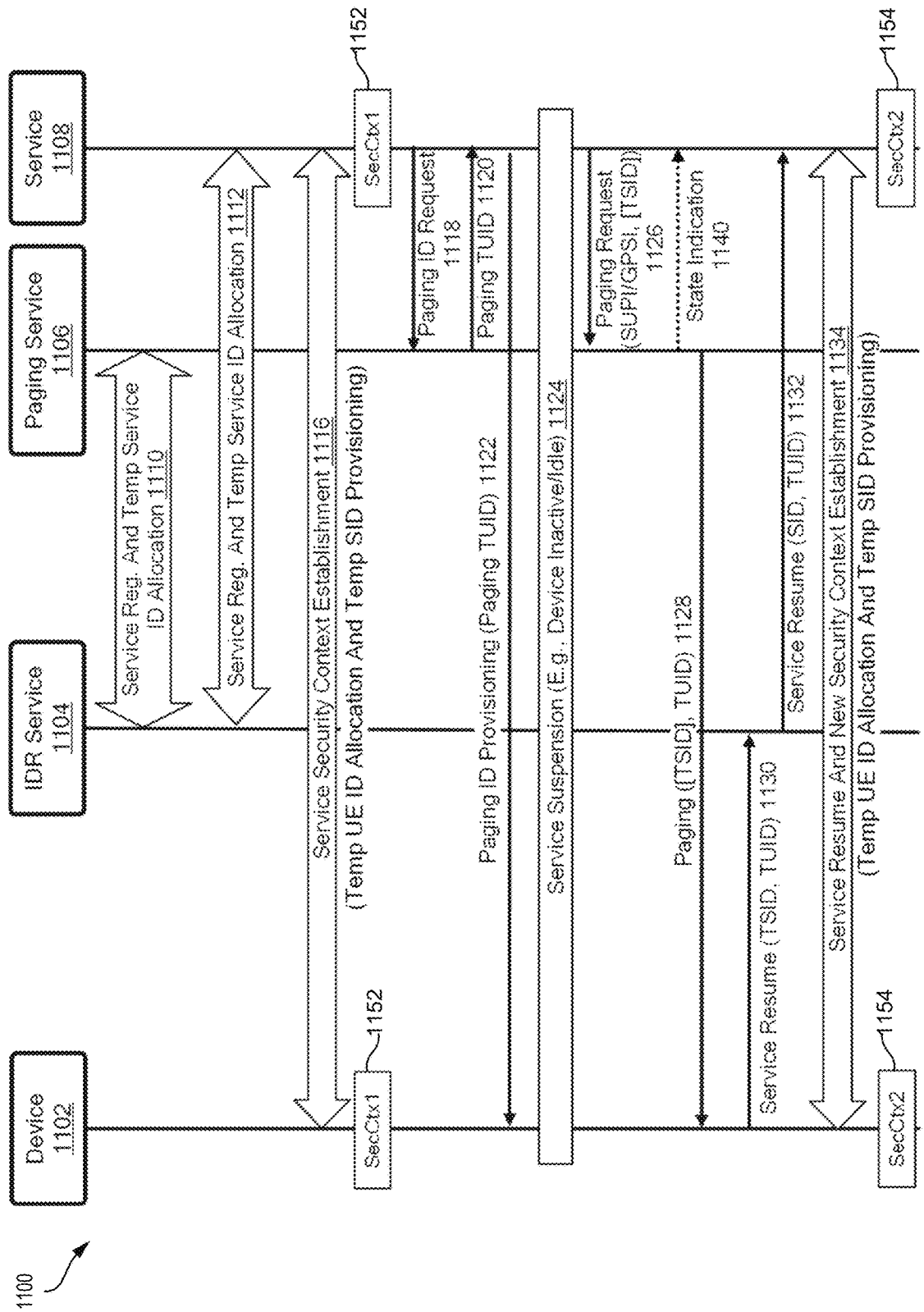
FIG. 11 is a call flow diagram illustrating paging in a wireless system where the device does not directly connect with the paging service, in accordance with aspects of the present disclosure

FIG. 11 is a call flow diagram illustrating paging in a wireless system 1100 where the device does not directly connect with the paging service, in accordance with aspects of the present disclosure. The wireless system 1100 illustrated in FIG. 11 includes a device 1102, an IDR service 1104, paging service 1106, and service 1108. The device 1102 may be substantially similar to device 502 of FIG. 5, device 702 of FIG. 7, device 802 of FIG. 8, and device 902 of FIG. 9. The IDR service 1104 may be substantially similar to IDR service 906 of FIG. 9. Service 1108 may be substantially similar to service 708 of FIG. 7. In FIG. 11, the paging service 1106 operates as a network service and the device 1102 does not establish a direct connection to the paging service 1106.

In some examples, the paging service 1106, at step 1110, may register with the IDR service 1104 and receive one or more allocated TSIDs in a manner substantially similar to that way as described above with respect to FIG. 10 and step 1010. In cases where the paging service is collocated with the mobility service, the paging service 1006 may skip step 1110 and use a TSID of the mobility service. Similarly, the service 1108, at step 1112, may register with the IDR service 1104 and receive one or more allocated TSIDs in a manner substantially similar to that way as described above with respect to FIG. 8 and step 808.

The device 1102, at step 1116, may establish a service security context 1152 with the service 1108. In some cases, the service security context 1152 with the service 1108 may be established in a manner substantially similar to that way as described above with respect to FIG. 8 and step 810. As a part of establishing the service security context 1152, the device 1102 may receive an allocated TUID and TSID for (e.g., associated with) the service 1108.

At step 1118, the service 1108 may send a paging ID request to the paging service 1106 to obtain the paging ID associated with the device 1102. In some cases, the paging ID request may include a permanent identifier for the device 1102, such as a SUPI or GPSI. Based on the paging ID request, the paging service 1106 may, based on the SUPI/GPSI, determine whether the device 1102 is associated with any existing paging IDs (e.g., for other services) and if so, the paging service may allocate a paging ID (e.g., paging TUID) for the service 1108 that falls into the same paging occasion of the existing paging IDs. If there are no existing paging IDs, a paging occasion may be selected and a paging ID that falls into the selected paging occasion used. In response to the paging ID request, the paging service 1106 may, at step 1120, transmit the paging ID for the device 1102. This paging ID may be a single paging ID for all services, such as service 1108, or multiple paging IDs (e.g., paging TUIDs) may be used, such as a per service paging ID or a paging ID shared by a number of services. In cases where the paging service is collocated with the mobility service and a single paging ID is used, the paging ID may be an existing TUID for the device 1102 associated with the mobility service. At step 1122, the service may send a paging ID provisioning message to the device 1102. The paging ID provisioning message may include the paging ID for the device 1102 to use for monitoring paging requests.

In some cases, at step 1124, access to the service may be suspended, and the service security context 1152 may be removed by the service 1108. For example, the device 1102 may enter an inactive/idle mode, or otherwise low power state and the service and the service 1108 may remove the service security context 1152.

In some cases, the service 1108 may page the device 1102, for example, when there is data for the device 1102. The service 1108 may page the device 1102, at step 1126, by sending a paging request message to the paging service 1106. In some cases, the paging request message may include a permanent identifier for the device 1002, such as a SUPI or GPSI. The paging request message may also include a TSID for the service (e.g., the TSID for the service 1108 sent to the device 1102 at step 1116). The paging service 1106 may determine, based on the permanent ID, the paging ID and TSID associated with the device 1102. During a paging occasion for the device 1102, the paging service 1106 may send, at step 1128, a paging message for the device 1002. In cases where a single paging ID can be used with multiple services (e.g., where a single paging ID is used for all services), the paging message may include the paging ID associated with the device 1002 and TSID for the service 1008. In cases where a per service paging ID is used, the paging message may include the paging ID and the TSID may be omitted as the device 1002 may determine which service 1108 is paging the device 1102 based on the paging ID.

After receiving the paging message, the device 1102 may attempt to reestablish a connection and security context 1154 with the service 1108, at steps 1130, 1132, and 1134, in a manner substantially similar manner to that described above with respect to steps 1030, 1032, and 1034 of FIG. 10.

In some cases, when the service 1108 attempts to page the device 1102 at step 1126, the device 1102 may already be in a connected state (e.g., if another service previously paged the device 1102 and the device 1102 has connected to horizontal services of the wireless system to access the other service) and paging the device 1102 again may not be necessary. In such cases, the paging service 1106 may respond, at step 1140, to the paging request with a state indication message indicating that the device 1102 is already in the connected state. The service 1108 may then attempt to reestablish a connection and security context 1154 with the device 1102, at steps 1130, 1132, and 1134. In such a case, steps 1130 and 1132 may be omitted.

Figure 12:
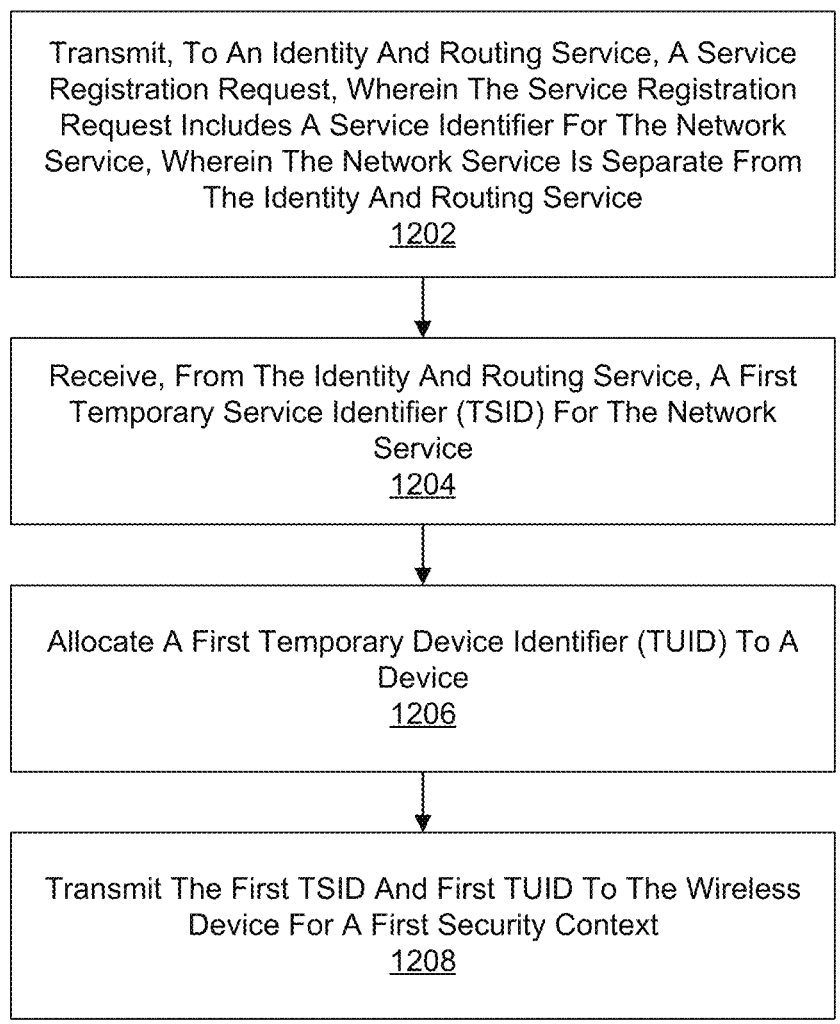
FIG. 12 is a flow diagram illustrating a process for wireless communications by a network service the wireless system, in accordance with aspects of the present disclosure.

FIG. 12 is a flow diagram illustrating a process 1200 for accessing a wireless system, in accordance with aspects of the present disclosure. The process 1200 can be performed by a component or system (e.g., a chipset) of a network device (e.g., core network 170 of FIG. 1, BS 102 of FIG. 1, mmW BS 180 of FIG. 1, AP 150 of FIG. 1, vertical services 524 of FIG. 5, horizontal services of FIG. 5, service 708 of FIG. 7, service 806 of FIG. 8, service 908 of FIG. 9, service 1008 of FIG. 10, service 1108 of FIG. 11, and/or computing system 1600 of FIG. 16). The device may be a mobile device (e.g., a mobile phone), a device (e.g., UE 152, 164, 182, 190 of FIG. 1, UE 104 of FIGS. 1-3, wireless device 407 of FIG. 4, device 502 of FIG. 5, device 702 of FIG. 7, device 802 of FIG. 8, device 902 of FIG. 9, device 1002 of FIG. 10, device 1102 of FIG. 11, computing system 1600 of FIG. 16, etc.), a network-connected wearable such as a watch, an extended reality (XR) device such as a virtual reality (VR) device or augmented reality (AR) device, a vehicle or component or system of a vehicle, or other type of computing device. The operations of the process 1200 may be implemented as software components that are executed and run on one or more processors (e.g., processor 1610 of FIG. 16 or other processor(s)). Further, the transmission and reception of signals in the process 1200 may be enabled, for example, by one or more antennas (e.g., antennas 234 of FIG. 2) and/or one or more transceivers (e.g., modulator-demodulator(s) 234 of FIG. 2).

At block 1202, the computing device (or component thereof) may transmit, to an identity and routing service (e.g., IDR service 804 of FIG. 8, IDR service 906 of FIG. 9, IDR service 1002 of FIG. 10, IDR service 1104 of FIG. 11, etc.), a service registration request (e.g., at step 808 of FIG. 8, step 910 of FIG. 9, step 1010 of FIG. 10, step 1110 of FIG. 11, etc.), wherein the service registration request includes a service identifier for the network service, wherein the network service is separate from the identity and routing service.

At block 1204, the computing device (or component thereof) may receive, from the identity and routing service, a first temporary service identifier (TSID) for the network service. In some cases, a TSID may be used in place of a service ID.

At block 1206, the computing device (or component thereof) may allocate a first temporary device identifier (TUID) to a device. In some cases, the allocated the first TUID is based on a security establishment with the device. In some examples, the security establishment with the device is based on establishing the first security context with the device, wherein the first security context is associated with the TSID and the first TUID.

At block 1208, the computing device (or component thereof) may transmit the first TSID and first TUID to the device for a first security context. In some cases, the computing device (or component thereof) may receive an indication that the device has entered a low-powered state (e.g., at step 812 of FIG. 8, step 914 of FIG. 9, step 1024 of FIG. 10, step 1124 of FIG. 11, etc.); and partially remove the first security context (e.g., SecCtx1 820 of FIG. 8, SecCtx1 1052 of FIG. 10, SecCtx1 1152 of FIG. 11, etc.) with the device. In some cases, the computing device (or component thereof) may receive, from a network entity, a service resume message from the device (e.g., at steps 814, 816 of FIG. 8, steps 916, 922 of FIG. 9, steps 1030, 1032 of FIG. 10, steps 1130, 1132 of FIG. 11, etc.) the service resume message including the first TUID for the device and the service identifier of the network service. In some examples, the network entity comprises the identity and routing service. In some cases, the network entity comprises a base station (e.g., BS 102 of FIG. 1-3, mmW BS 180 of FIG. 1, AP 150 of FIG. 1, DU 504 of FIG. 5, BD 50-6 of FIG. 6, DU 904 of FIG. 9). In some examples, the computing device (or component thereof) may allocate a second TUID to the device (e.g., at step 818 of FIG. 8, step 924 of FIG. 9, step 1034 of FIG. 10, step 1134 of FIG. 11, etc.); and transmit the second TUID to the device to establish a second security context (e.g., SecCtx2 822 of FIG. 9, SecCtx2 1054 of FIG. 10, SecCtx2 1154 of FIG. 11, etc.) with the device. In some cases, the computing device (or component thereof) may associate the device with a second TSID; and transmit the second TSID to the device for establishing a second security context.

In some examples, the computing device (or component thereof) may transmit a paging request (e.g., at step 1026 of FIG. 10, step 1126 of FIG. 11, etc.) for the device to a paging service (e.g., paging service 1006 of FIG. 10, paging service 1106 of FIG. 11, etc.) of the wireless network. In some cases, the computing device (or component thereof) may receive, from the paging service in response to the paging request, an indication that the device is in a connected state (e.g., at step 1040 of FIG. 10, step 1140 of FIG. 11, etc.). In some cases, the service resume message is received in response to the paging request. In some examples, the computing device (or component thereof) may transmit a paging identifier request to the paging service (e.g., at 1118 of FIG. 11), wherein the paging identifier request includes a permanent identifier for the device. In some cases, the permanent identifier for the device comprises at least one of a subscriber permanent identifier or a generic public subscription identifier for the device. In some examples, the computing device (or component thereof) may receive, in response to the paging identifier request, a paging identifier for the device (e.g., at step 1120 of FIG. 11); and transmit the paging identifier to the device (e.g., at step 1122 of FIG. 11). In some cases, the paging identifier is used by a plurality of network services. In other cases, the paging identifier is service specific. In some examples, the paging identifier request includes the first TSID. In some cases, the paging request includes a permanent identifier for the device.

Figure 13:
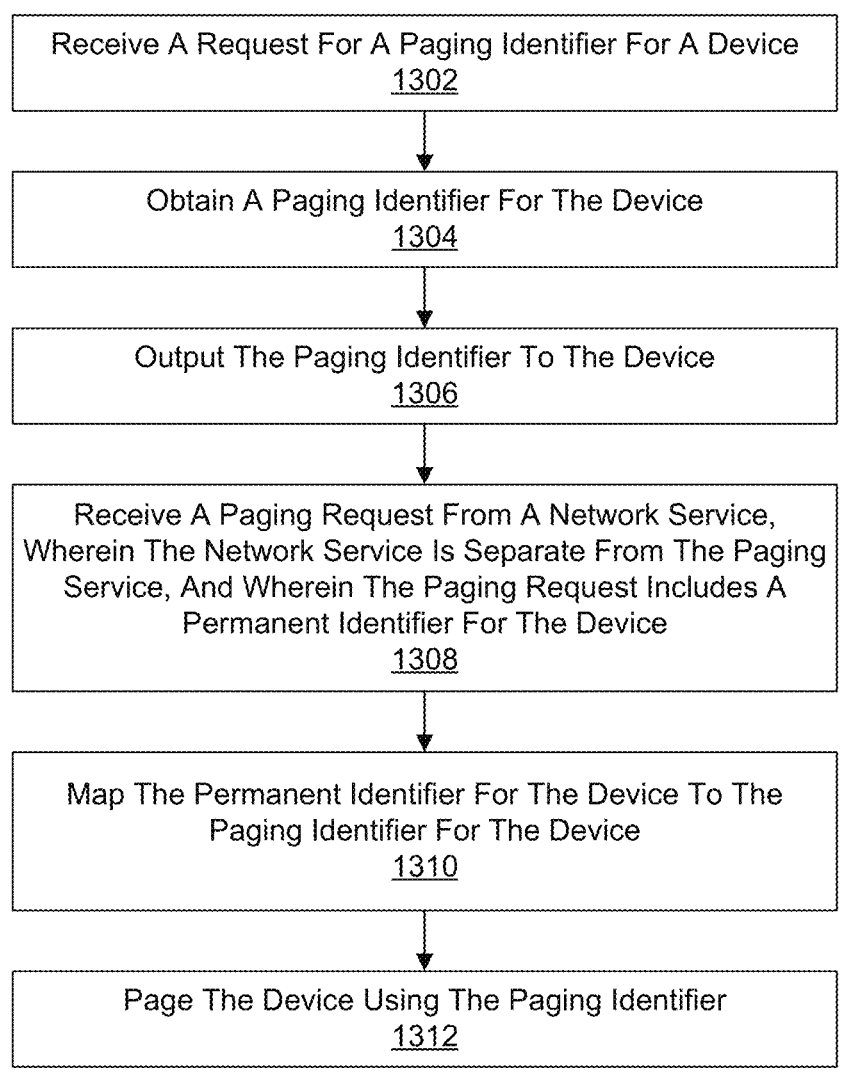
FIG. 13 is a flow diagram illustrating a process for wireless communications by a paging service of a wireless network, in accordance with aspects of the present disclosure.

FIG. 13 is a flow diagram illustrating a process 1300 for accessing a wireless system, in accordance with aspects of the present disclosure. The process 1300 can be performed by a component or system (e.g., a chipset) of a network device (e.g., core network 170 of FIG. 1, BS 102 of FIG. 1, mmW BS 180 of FIG. 1, AP 150 of FIG. 1, paging service 1006 of FIG. 10, paging service 1106 of FIG. 11, and computing system 1600 of FIG. 16). The device may be a mobile device (e.g., a mobile phone), a device (e.g., UE 152, 164, 182, 190 of FIG. 1, UE 104 of FIGS. 1-3, wireless device 407 of FIG. 4, device 502 of FIG. 5, device 702 of FIG. 7, device 802 of FIG. 8, device 902 of FIG. 9, device 1002 of FIG. 10, device 1102 of FIG. 11, computing system 1600 of FIG. 16, etc.), a network-connected wearable such as a watch, an extended reality (XR) device such as a virtual reality (VR) device or augmented reality (AR) device, a vehicle or component or system of a vehicle, or other type of computing device. The operations of the process 1300 may be implemented as software components that are executed and run on one or more processors (e.g., processor 1610 of FIG. 16 or other processor(s)). Further, the transmission and reception of signals in the process 1300 may be enabled, for example, by one or more antennas (e.g., antennas 234 of FIG. 2) and/or one or more transceivers (e.g., modulator-demodulator(s) 234 of FIG. 2).

At block 1302, the computing device (or component thereof) may receive a request for a paging identifier for a device (e.g., at step 1014 of FIG. 10, step 1118 of FIG. 11, etc.).

At block 1304, the computing device (or component thereof) may obtain a paging identifier for the device. In some cases, the paging identifier is used by a plurality of network services. In other cases, the paging identifier is service specific.

At block 1306, the computing device (or component thereof) may output the paging identifier to the device (e.g., at step 1014 of FIG. 10, steps 1120, 1122 of FIG. 11, etc.). In some cases, the computing device (or component thereof) may establish a security context (e.g., service security context 1050 of FIG. 10) with the device (e.g., at step 1014 of FIG. 10), and where outputting the paging identifier to the device includes transmitting the paging identifier to the device.

At block 1308, the computing device (or component thereof) may receive a paging request (e.g., at step 1026 of FIG. 10, step 1126 of FIG. 11, etc.) from a network service (e.g., vertical services 524 of FIG. 5, horizontal services of FIG. 5, service 708 of FIG. 7, service 806 of FIG. 8, service 908 of FIG. 9, service 1008 of FIG. 10, service 1108 of FIG. 11, etc.), wherein the network service is separate from the paging service, and wherein the paging request includes a permanent identifier for the device. In some examples, the paging request includes a temporary service identifier. In some cases, the computing device (or component thereof) may receive a paging identifier request from the network service (e.g., at step 1118 of FIG. 11, etc.), wherein the paging identifier request includes a permanent identifier for the device; and transmit, in response to the paging identifier request, a paging identifier for the device to the network service (e.g., at step 1120 of FIG. 11). In some examples, the permanent identifier for the device comprises at least one of a subscriber permanent identifier or a generic public subscription identifier for the device.

At block 1310, the computing device (or component thereof) may map the permanent identifier for the device to the paging identifier for the device.

At block 1312, the computing device (or component thereof) may page the device using the paging identifier (e.g., at step 1028 of FIG. 10, step 1128 of FIG. 11).

Figure 14:
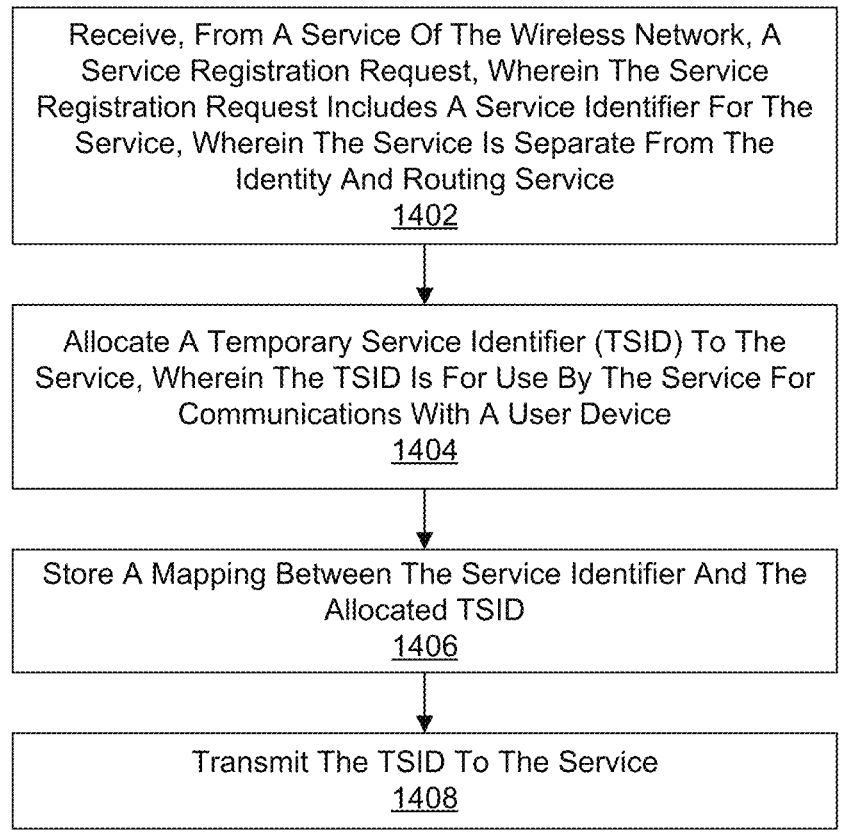
FIG. 14 is a flow diagram illustrating a process for wireless communications by an identity and routing service of a wireless network, in accordance with aspects of the present disclosure.

FIG. 14 is a flow diagram illustrating a process 1400 for accessing a wireless system, in accordance with aspects of the present disclosure. The process 1400 can be performed by a component or system (e.g., a chipset) of a network device (e.g., core network 170 of FIG. 1, BS 102 of FIG. 1, mmW BS 180 of FIG. 1, AP 150 of FIG. 1, IDR service 804 of FIG. 8, IDR service 906 of FIG. 9, IDR service 1002 of FIG. 10, IDR service 1104 of FIG. 11, and/or computing system 1600 of FIG. 16). The device may be a mobile device (e.g., a mobile phone), a device (e.g., UE 152, 164, 182, 190 of FIG. 1, UE 104 of FIGS. 1-3, wireless device 407 of FIG. 4, device 502 of FIG. 5, device 702 of FIG. 7, device 802 of FIG. 8, device 902 of FIG. 9, device 1002 of FIG. 10, device 1102 of FIG. 11, computing system 1600 of FIG. 16, etc.), a network-connected wearable such as a watch, an extended reality (XR) device such as a virtual reality (VR) device or augmented reality (AR) device, a vehicle or component or system of a vehicle, or other type of computing device. The operations of the process 1400 may be implemented as software components that are executed and run on one or more processors (e.g., processor 1610 of FIG. 16 or other processor(s)). Further, the transmission and reception of signals in the process 1400 may be enabled, for example, by one or more antennas (e.g., antennas 234 of FIG. 2) and/or one or more transceivers (e.g., modulator-demodulator(s) 234 of FIG. 2).

At block 1402, the computing device (or component thereof) may receive, from a service (e.g., vertical services 524 of FIG. 5, horizontal services of FIG. 5, service 708 of FIG. 7, service 806 of FIG. 8, service 908 of FIG. 9, service 1008 of FIG. 10, service 1108 of FIG. 11, etc.) of the wireless network, a service registration request (e.g., at step 808 of FIG. 8, step 910 of FIG. 9, step 1010 of FIG. 10, step 1110 of FIG. 11, etc.), wherein the service registration request includes a service identifier for the service, wherein the service is separate from the identity and routing service. In some cases, the service registration request includes an indication that multiple TSID are requested. In such cases, the computing device (or components thereof) may allocate a set of TSIDs to the service based on the indication that multiple TSIDs are requested. In some cases, the identity and routing service is collocated with a routing service.

At block 1404, the computing device (or component thereof) may allocate a temporary service identifier (TSID) to the service, wherein the TSID is for use by the service for communications with a device.

At block 1406, the computing device (or component thereof) may store a mapping between the service identifier and the allocated TSID.

At block 1408, the computing device (or component thereof) may transmit the TSID to the service (e.g., at step 810 of FIG. 8, step 912 of FIG. 9, step 1012 of FIG. 10, step 1112 of FIG. 11, etc.). In some cases, the computing device (or component thereof) may receive, from the device, a service resume message (e.g., at step 814 of FIG. 8, step 1030 of FIG. 10, step 1130 of FIG. 11, etc.); determine that the received service resume message is for the service based on the TSID included in the service resume message and the stored mapping; and transmit the service resume message to the service (e.g., at step 816 of FIG. 8, step 1032 of FIG. 10, 1132 of FIG. 11). In some cases, the service resume message includes a temporary device identifier assigned by the service. In some cases, the computing device (or component thereof) may receive, from a network entity, a service identifier query (e.g., at step 918 of FIG. 9, etc.), the service identifier query including a TSID; determine that the received service resume message is for the service based on the TSID; and transmit the service identifier to the network entity (e.g., at step 920 of FIG. 9, etc.). In some cases, the network entity comprises a base station (e.g., BS 102 of FIG. 1-3, mmW BS 180 of FIG. 1, AP 150 of FIG. 1, DU 504 of FIG. 5, BD 50-6 of FIG. 6, DU 904 of FIG. 9).

Figure 15:
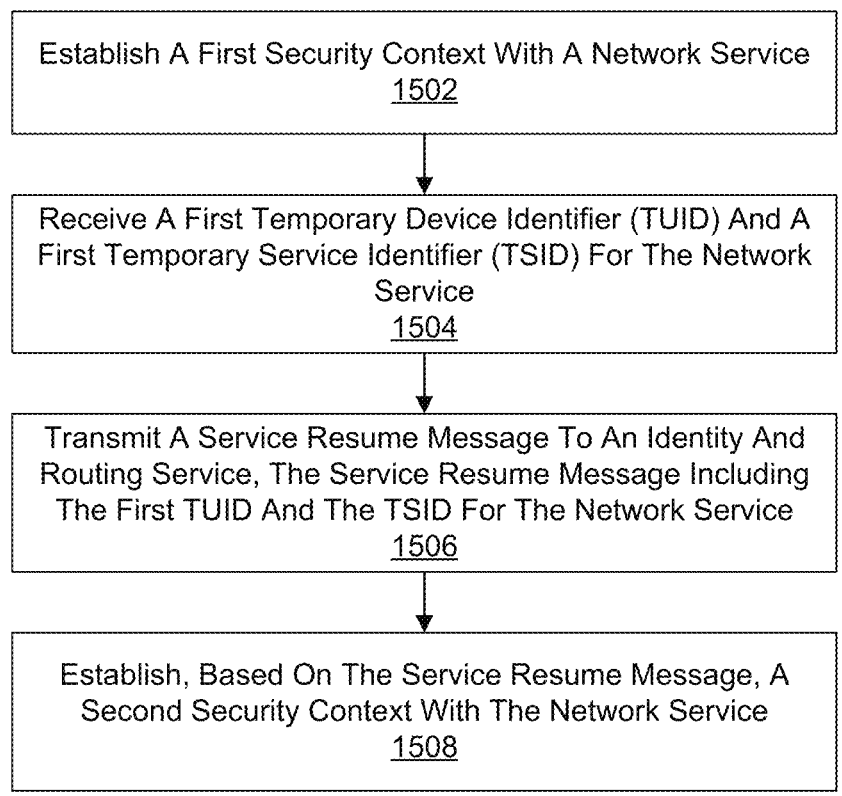
FIG. 15 is a flow diagram illustrating a process for accessing a wireless system, in accordance with aspects of the present disclosure.

FIG. 15 is a flow diagram illustrating a process 1500 for accessing a wireless system, in accordance with aspects of the present disclosure. The process 1500 can be performed by a component or system (e.g., a chipset) of a device. The device may be a mobile device (e.g., a mobile phone), a device (e.g., UE 152, 164, 182, 190 of FIG. 1, UE 104 of FIGS. 1-3, wireless device 407 of FIG. 4, device 502 of FIG. 5, device 702 of FIG. 7, device 802 of FIG. 8, device 902 of FIG. 9, device 1002 of FIG. 10, device 1102 of FIG. 11, computing system 1600 of FIG. 16, etc.), a network-connected wearable such as a watch, an extended reality (XR) device such as a virtual reality (VR) device or augmented reality (AR) device, a vehicle or component or system of a vehicle, or other type of computing device. The operations of the process 1500 may be implemented as software components that are executed and run on one or more processors (e.g., processor 484 of FIG. 4, processor 1610 of FIG. 16 or other processor(s)). Further, the transmission and reception of signals in the process 1500 may be enabled, for example, by one or more antennas (e.g., antennas 252 of FIG. 2) and/or one or more transceivers (e.g., modulator-demodulator(s) 254 of FIG. 2).

At block 1502, the computing device (or component thereof) may establish a first security context (e.g., at step 810 of FIG. 8, step 912 of FIG. 9, step 1016 of FIG. 10, step 1116 of FIG. 11) with a network service (e.g., vertical services 524 of FIG. 5, horizontal services of FIG. 5, service 708 of FIG. 7, service 806 of FIG. 8, service 908 of FIG. 9, service 1008 of FIG. 10, service 1108 of FIG. 11, etc.). In some cases, the computing device (or component thereof) may transmit a request for a paging identifier to a paging service of the wireless network (e.g., at step 1014 of FIG. 10, etc.). In some cases, the computing device (or component thereof) may receive a paging identifier from the wireless network in response to the request for the paging identifier.

At block 1504, the computing device (or component thereof) may receive a first temporary device identifier (TUID) and a first temporary service identifier (TSID) for the network service. In some cases, the computing device (or component thereof) may transmit an indication that the device is entering a low-powered state (e.g., at step 812 of FIG. 8, step 914 of FIG. 9, step 1024 of FIG. 10, step 1124 of FIG. 11, etc.).

At block 1506, the computing device (or component thereof) may transmit a service resume message to a network entity (e.g., at step 814 of FIG. 8, step 916 of FIG. 9, step 1030 of FIG. 10, step 1130 of FIG. 11, etc.), the service resume message including the first TUID and the TSID for the network service. In some cases, the network entity comprises an IDR service (e.g., IDR service 804 of FIG. 8, IDR service 906 of FIG. 9, IDR service 1002 of FIG. 10, IDR service 1104 of FIG. 11, etc.). In some cases, the network entity comprises a base station (e.g., BS 102 of FIG. 1-3, mmW BS 180 of FIG. 1. AP 150 of FIG. 1. DU 504 of FIG. 5, BD 50-6 of FIG. 6, DU 904 of FIG. 9). In some cases, the computing device (or component thereof) may receive a paging message from the paging service (e.g., at step 1028 of FIG. 10, step 1128 of FIG. 11, etc.). In some cases, the service resume message is transmitted in response to the received paging message. In some cases, the paging message includes the paging identifier and the first TSID. In some cases, paging identifier is used by a plurality of network services. In other cases, the paging message includes a service specific paging identifier.

At block 1508, the computing device (or component thereof) may establish, based on the service resume message, a second security context (e.g., SecCtx2 822 of FIG. 8, SecCtx2 1054 of FIG. 10, SecCtx2 1154 of FIG. 11) with the network service. In some cases, the computing device (or component thereof) may receive a second TUID and a second TSID (e.g., at step 818 of FIG. 8, step 924 of FIG. 9, step 1034 of FIG. 10, step 1134 of FIG. 11, etc.). In some cases, the the second security context is established based on the second TUID and the second TSID.

Figure 16:
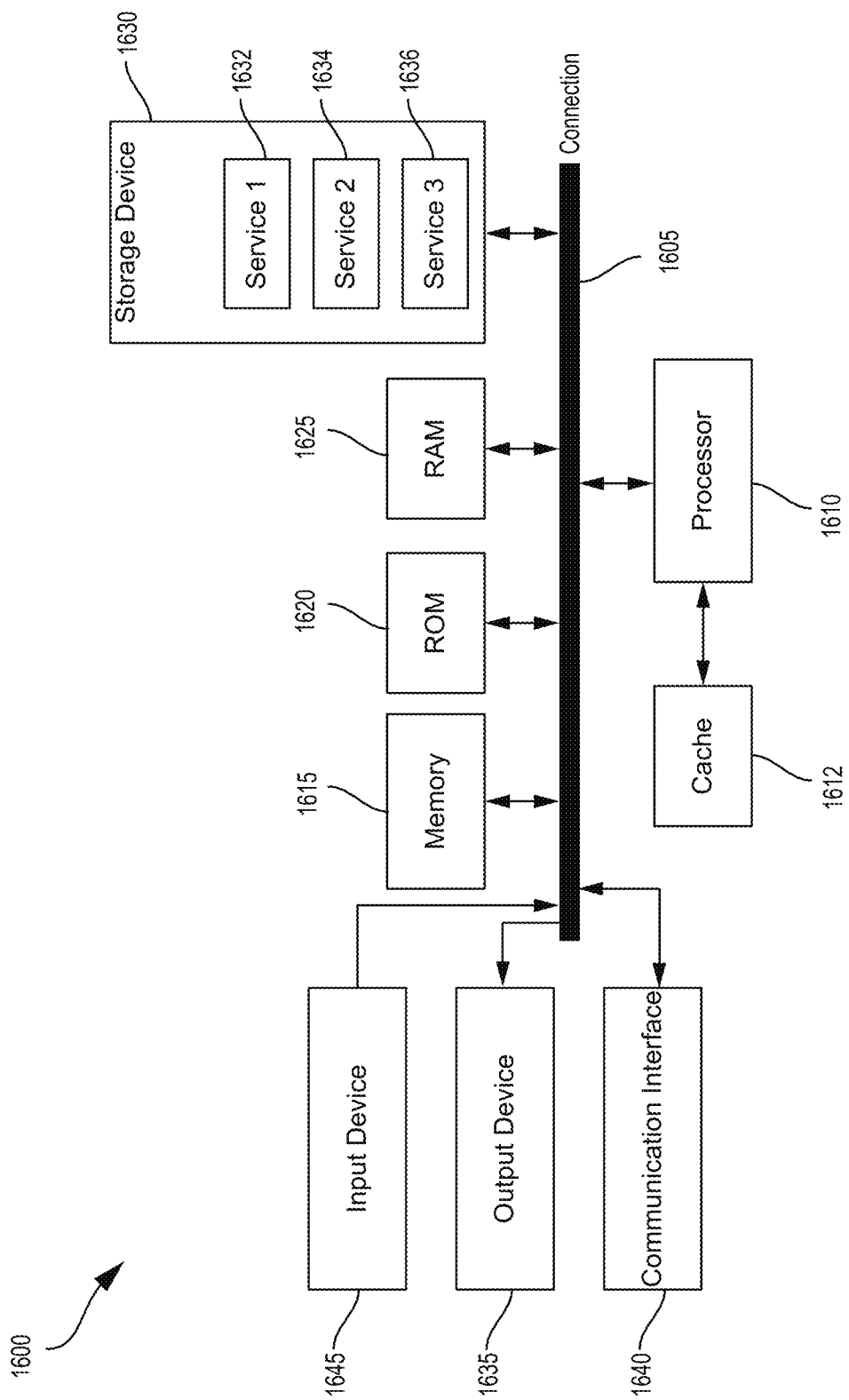
FIG. 16 is a diagram illustrating an example of a system for implementing certain aspects of the present technology.

FIG. 16 is a diagram illustrating an example of a system for implementing certain aspects of the present technology. In particular, FIG. 16 illustrates an example of computing system 1600, which may be for example any computing device making up internal computing system, a remote computing system, a camera, or any component thereof in which the components of the system are in communication with each other using connection 1605. Connection 1605 may be a physical connection using a bus, or a direct connection into processor 1610, such as in a chipset architecture. Connection 1605 may also be a virtual connection, networked connection, or logical connection.

In some embodiments, computing system 1600 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1600 includes at least one processing unit (CPU or processor) 1610 and connection 1605 that communicatively couples various system components including system memory 1615, such as read-only memory (ROM) 1620 and random access memory (RAM) 1625 to processor 1610. Computing system 1600 may include a cache 1612 of high-speed memory connected directly with, in close proximity to, or integrated as part of processor 1610.

Processor 1610 may include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which may represent any number of input mechanisms, such as a microphone for speech, a touch-sensitive screen for gesture or graphical input, keyboard, mouse, motion input, speech, etc. Computing system 1600 may also include output device 1635, which may be one or more of a number of output mechanisms. In some instances, multimodal systems may enable a user to provide multiple types of input/output to communicate with computing system 1600.

Computing system 1600 may include communications interface 1640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1630 may include software services, servers, services, etc., that when the code that defines such software is executed by the processor 1610, it causes the system to perform a function. In some embodiments, a hardware service that performs a particular function may include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for wireless communications by a network service of a wireless network, comprising: a memory system comprising instructions; and a processor system coupled to the memory system, wherein the processor system is configured to: transmit, to an identity and routing service, a service registration request, wherein the service registration request includes a service identifier for the network service, wherein the network service is separate from the identity and routing service; receive, from the identity and routing service, a first temporary service identifier (TSID) for the network service; allocate a first temporary device identifier (TUID) to a device; and transmit the first TSID and first TUID to the device for a first security context.

Aspect 2. The apparatus of Aspect 1, wherein the processor system is further configured to: receive an indication that the device has entered a low-powered state; and partially remove the first security context with the device.

Aspect 3. The apparatus of any of Aspects 1-2, wherein the processor system is further configured to: receive, from a network entity, a service resume message from the device, the service resume message including the first TUID for the device and the service identifier of the network service.

Aspect 4. The apparatus of Aspect 3, wherein the processor system is further configured to: allocate a second TUID to the device; and transmit the second TUID to the device to establish a second security context with the device.

Aspect 5. The apparatus of Aspect 3, wherein the processor system is further configured to: associate the device with a second TSID; and transmit the second TSID to the device for establishing a second security context.

Aspect 6. The apparatus of any of Aspects 3-5, wherein the network entity comprises the identity and routing service.

Aspect 7. The apparatus of any of Aspects 3-5, wherein the network entity comprises a base station.

Aspect 8. The apparatus of any of Aspects 3-7, wherein the processor system is further configured to transmit a paging request for the device to a paging service of the wireless network.

Aspect 9. The apparatus of Aspect 8, wherein the processor system is further configured to receive, from the paging service in response to the paging request, an indication that the device is in a connected state.

Aspect 10. The apparatus of Aspect 8, wherein the service resume message is received in response to the paging request.

Aspect 11. The apparatus of any of Aspects 8-10, wherein the processor system is further configured to transmit a paging identifier request to the paging service, wherein the paging identifier request includes a permanent identifier for the device.

Aspect 12. The apparatus of Aspect 11, wherein the permanent identifier for the device comprises at least one of a subscriber permanent identifier or a generic public subscription identifier for the device.

Aspect 13. The apparatus of any of Aspects 11-12, wherein the processor system is further configured to: receive, in response to the paging identifier request, a paging identifier for the device; and transmit the paging identifier to the device.

Aspect 14. The apparatus of Aspect 13, wherein the paging identifier is used by a plurality of network services.

Aspect 15. The apparatus of Aspect 14, wherein the paging identifier request includes the first TSID.

Aspect 16. The apparatus of Aspect 14, wherein the paging request includes the first TSID.

Aspect 17. The apparatus of any of Aspects 13-16, wherein the paging identifier is service specific.

Aspect 18. The apparatus of any of Aspects 8-17, wherein the paging request includes a permanent identifier for the device.

Aspect 19. The apparatus of any of Aspects 1-18, wherein the allocated the first TUID is based on a security establishment with the device.

Aspect 20. The apparatus of Aspect 19, wherein the security establishment with the device is based on establishing the first security context with the device, wherein the first security context is associated with the TSID and the first TUID.

Aspect 21. An apparatus for wireless communications by a paging service of a wireless network, comprising: a memory system comprising instructions; and a processor system coupled to the memory system, wherein the processor system is configured to: receive a request for a paging identifier for a device; obtain a paging identifier for the device; output the paging identifier to the device; receive a paging request from a network service, wherein the network service is separate from the paging service, and wherein the paging request includes a permanent identifier for the device; map the permanent identifier for the device to the paging identifier for the device; and page the device using the paging identifier.

Aspect 22. The apparatus of Aspect 21, wherein the processor system is further configured to establish a security context with the device, and wherein, to output the paging identifier to the device, the processor system is configured to transmit the paging identifier to the device.

Aspect 23. The apparatus of any of Aspects 21-22, wherein the processor system is further configured to: receive a paging identifier request from the network service, wherein the paging identifier request includes a permanent identifier for the device; and transmit, in response to the paging identifier request, a paging identifier for the device to the network service.

Aspect 24. The apparatus of any of Aspects 21-23, wherein the permanent identifier for the device comprises at least one of a subscriber permanent identifier or a generic public subscription identifier for the device.

Aspect 25. The apparatus of any of Aspects 21-24, wherein the paging identifier is used by a plurality of network services.

Aspect 26. The apparatus of Aspect 25, wherein the paging request includes a temporary service identifier.

Aspect 27. The apparatus of any of Aspects 21-24, wherein the paging identifier is service specific.

Aspect 28. An apparatus for wireless communications by an identity and routing service of a wireless network, comprising: a memory system comprising instructions; and a processor system coupled to the memory system, wherein the processor system is configured to: receive, from a service of the wireless network, a service registration request, wherein the service registration request includes a service identifier for the service, wherein the service is separate from the identity and routing service; allocate a temporary service identifier (TSID) to the service, wherein the TSID is for use by the service for communications with a device; store a mapping between the service identifier and the allocated TSID; and transmit the TSID to the service.

Aspect 29. The apparatus of Aspect 28, wherein the processor system is further configured to: receive, from the device, a service resume message; determine that the received service resume message is for the service based on the TSID included in the service resume message and the stored mapping; and transmit the service resume message to the service.

Aspect 30. The apparatus of Aspect 29, wherein the service resume message includes a temporary device identifier assigned by the service.

Aspect 31. The apparatus of any of Aspects 29 or 30, wherein the processor system is further configured to: receive, from a network entity, a service identifier query, the service identifier query including a TSID; determine that the received service resume message is for the service based on the TSID; and transmit the service identifier to the network entity.

Aspect 32. The apparatus of Aspect 31, wherein the network entity comprises a base station.

Aspect 33. The apparatus of any of Aspects 28-32, wherein the service registration request includes an indication that multiple TSID are requested, and wherein the processor system is further configured to allocate a set of TSIDs to the service based on the indication that multiple TSIDs are requested.

Aspect 34. The apparatus of any of Aspects 28-33, wherein the identity and routing service is collocated with a routing service.

Aspect 35. A device for wireless communications with a network service of a wireless network, comprising: a memory system comprising instructions; and a processor system coupled to the memory system, wherein the processor system is configured to: establish a first security context with the network service; receive a first temporary device identifier (TUID) and a first temporary service identifier (TSID) for the network service; transmit a service resume message to an identity and routing service, the service resume message including the first TUID and the TSID for the network service; and establish, based on the service resume message, a second security context with the network service.

Aspect 36. The device of Aspect 35, wherein the processor system is further configured to transmit an indication that the device is entering a low-powered state.

Aspect 37. The device of any of Aspects 35-36, wherein the processor system is further configured to receive a second TUID and a second TSID.

Aspect 38. The device of Aspect 37, wherein the second security context is established based on the second TUID and the second TSID.

Aspect 39. The device of any of Aspects 35-38, wherein the processor system is further configured to transmit a request for a paging identifier to a paging service of the wireless network.

Aspect 40. The device of Aspect 39, wherein the processor system is further configured to receive a paging identifier from the wireless network in response to the request for the paging identifier.

Aspect 41. The device of any of Aspects 39-40, wherein the processor system is further configured to receive a paging message from the paging service.

Aspect 42. The device of Aspect 41, wherein the service resume message is transmitted in response to the received paging message.

Aspect 43. The device of any of Aspects 41-42, wherein the paging message includes the paging identifier and the first TSID.

Aspect 44. The device of Aspect 43, wherein the paging identifier is used by a plurality of network services.

Aspect 45. The device of any of Aspects 41-43, wherein the paging message includes a service specific paging identifier.

Aspect 46. A method for wireless communications by a network service of a wireless network, comprising: transmitting, to a network entity, a service registration request, wherein the service registration request includes a service identifier for the network service, wherein the network service is separate from the identity and routing service; receiving, from the identity and routing service, a first temporary service identifier (TSID) for the network service; allocating a first temporary device identifier (TUID) to a device; and transmitting the first TSID and first TUID to the device for a first security context.

Aspect 47. The method of Aspect 46, further comprising: receiving an indication that the device has entered a low-powered state; and partially removing the first security context with the device.

Aspect 48. The method of any of Aspects 46-47, further comprising receiving, from a network entity, a service resume message from the device, the service resume message including the first TUID for the device and the service identifier of the network service.

Aspect 49. The method of Aspect 48, further comprising: allocating a second TUID to the device; and transmitting the second TUID to the device to establish a second security context with the device.

Aspect 50. The method of Aspect 48, further comprising: associating the device with a second TSID; and transmitting the second TSID to the device for establishing a second security context.

Aspect 51. The method of any of Aspects 48-50, wherein the network entity comprises the identity and routing service.

Aspect 52. The method of any of Aspects 48-50, wherein the network entity comprises a base station.

Aspect 53. The method of any of Aspects 48-52, further comprising transmitting a paging request for the device to a paging service of the wireless network.

Aspect 54. The method of Aspect 53, further comprising receiving, from the paging service in response to the paging request, an indication that the device is in a connected state.

Aspect 55. The method of Aspect 53, wherein the service resume message is received in response to the paging request.

Aspect 56. The method of any of Aspects 53-55, further comprising transmitting a paging identifier request to the paging service, wherein the paging identifier request includes a permanent identifier for the device.

Aspect 57. The method of Aspect 56, wherein the permanent identifier for the device comprises at least one of a subscriber permanent identifier or a generic public subscription identifier for the device.

Aspect 58. The method of any of Aspects 56-57, further comprising: receiving, in response to the paging identifier request, a paging identifier for the device; and transmitting the paging identifier to the device.

Aspect 59. The method of Aspect 58, wherein the paging identifier is used by a plurality of network services.

Aspect 60. The method of Aspect 59, wherein the paging identifier request includes the first TSID.

Aspect 61. The method of Aspect 59, wherein the paging request includes the first TSID.

Aspect 62. The method of any of Aspects 58-61, wherein the paging identifier is service specific.

Aspect 63. The method of any of Aspects 53-62, wherein the paging request includes a permanent identifier for the device.

Aspect 64. The method of any of Aspects 46-63, wherein the allocated first TUID is based on a security establishment with the device.

Aspect 65. The method of Aspect 64, wherein the security establishment with the device is based on establishing the first security context with the device, wherein the first security context is associated with the TSID and the first TUID.

Aspect 66. A method for wireless communications by a paging service of a wireless network, comprising: receiving a request for a paging identifier for a device; obtaining a paging identifier for the device; outputting the paging identifier to the device; receive a paging request from a network service, wherein the network service is separate from the paging service, and wherein the paging request includes a permanent identifier for the device; mapping the permanent identifier for the device to the paging identifier for the device; and paging the device using the paging identifier.

Aspect 67. The method of Aspect 66, further comprising establishing a security context with the device, and wherein outputting the paging identifier comprises transmitting the paging identifier to the device.

Aspect 68. The method of any of Aspects 66-67, further comprising: receiving a paging identifier request from the network service, wherein the paging identifier request includes a permanent identifier for the device; and transmitting, in response to the paging identifier request, a paging identifier for the device to the network service.

Aspect 69. The method of any of Aspects 66-68, wherein the permanent identifier for the device comprises at least one of a subscriber permanent identifier or a generic public subscription identifier for the device.

Aspect 70. The method of any of Aspects 66-69, wherein the paging identifier is used by a plurality of network services.

Aspect 71. The method of Aspect 70, wherein the paging request includes a temporary service identifier.

Aspect 72. The method of any of Aspects 66-69, wherein the paging identifier is service specific.

Aspect 73. A method for wireless communications by an identity and routing service of a wireless network, comprising: receiving, from a service of the wireless network, a service registration request, the service registration request including a service identifier for the service, wherein the service is separate from the identity and routing service; allocating a temporary service identifier (TSID) to the service, wherein the TSID is for use by the service for communications with a user device; storing a mapping between the service identifier and the allocated TSID; and transmitting the TSID to the service.

Aspect 74. The method of Aspect 73, further comprising: receiving, from a wireless device, a service resume message; determining that the received service resume message is for the service based on the TSID included in the service resume message and the stored mapping; and transmitting the service resume message to the service.

Aspect 75. The method of Aspect 74, wherein the service resume message includes a temporary device identifier assigned by the service.

Aspect 76. The method of any of Aspects 74 or 75, further comprising: receiving, from a wireless device, a service resume message; receiving, from a network entity, a service identifier query, the service identifier query including a TSID; determining that the received service resume message is for the service based on the TSID; and transmitting the service identifier to the network entity.

Aspect 77. The method of Aspect 76, wherein the network entity comprises a base station.

Aspect 78. The method of any of Aspects 73-77, wherein the service registration request includes an indication that multiple TSID are requested, and further comprising allocating a set of TSIDs to the service based on the indication that multiple TSIDs are requested.

Aspect 79. The method of any of Aspects 73-78, wherein the identity and routing service is collocated with a routing service.

Aspect 80. A method for wireless communications with a network service of a wireless network, comprising: establishing a first security context with the network service; receiving a first temporary device identifier (TUID) and a first temporary service identifier (TSID) for the network service; transmitting a service resume message to a network entity, the service resume message including the first TUID and the TSID for the network service; and establishing, based on the service resume message, a second security context with the network service.

Aspect 81. The method of Aspect 80, further comprising transmitting an indication that the device is entering a low-powered state.

Aspect 82. The method of any of Aspects 80-81, further comprising receiving a second TUID and a second TSID.

Aspect 83. The method of Aspect 82, wherein the second security context is established based on the second TUID and the second TSID.

Aspect 84. The method of any of Aspects 80-83, further comprising transmitting a request for a paging identifier to a paging service of the wireless network.

Aspect 85. The method of Aspect 84, further comprising receiving a paging identifier from the wireless network in response to the request for the paging identifier.

Aspect 86. The method of any of Aspects 84-85, further comprising receiving a paging message from the paging service.

Aspect 87. The method of Aspect 86, wherein the service resume message is transmitted in response to the received paging message.

Aspect 88. The method of any of Aspects 86-87, wherein the paging message includes the paging identifier and the first TSID.

Aspect 89. The method of Aspect 88, wherein the paging identifier is used by a plurality of network services.

Aspect 90. The method of any of Aspects 86-88, wherein the paging message includes a service specific paging identifier.

Aspect 91. A non-transitory computer-readable storage medium comprising instructions stored thereon which, when executed by at least one processor, causes the at least one processor to perform operations according to any of Aspects 46-90.

Aspect 66. An apparatus for wireless communications comprising one or more means for performing operations according to any of Aspects 46-90.

What is claimed is:

1. A device for wireless communications with a network service of a wireless network, comprising:
   a memory system comprising instructions; and
   a processor system coupled to the memory system, wherein the processor system is configured to:
   establish a first security context with a network service;
   receive a first temporary device identifier (TUID) and a first temporary service identifier (TSID) for the network service;
   transmit a service resume message to a network entity, the service resume message including the first TUID and the TSID for the network service; and
   establish, based on the service resume message, a second security context with the network service.

2. The device of claim 1, wherein the processor system is further configured to transmit an indication that the device is entering a low-powered state.

3. The device of claim 1, wherein the processor system is further configured to receive a second TUID and a second TSID.

4. The device of claim 3, wherein the second security context is established based on the second TUID and the second TSID.

5. The device of claim 1, wherein the processor system is further configured to transmit a request for a paging identifier to a paging service of the wireless network.

6. The device of claim 5, wherein the processor system is further configured to receive a paging identifier from the wireless network in response to the request for the paging identifier.

7. The device of claim 5, wherein the processor system is further configured to receive a paging message from the paging service.

8. The device of claim 7, wherein the service resume message is transmitted in response to the received paging message.

9. The device of claim 7, wherein the paging message includes the paging identifier and the first TSID.

10. The device of claim 9, wherein the paging identifier is used by a plurality of network services.

11. The device of claim 7, wherein the paging message includes a service specific paging identifier.

12. A method for wireless communications with a network service of a wireless network, comprising:
    establishing a first security context with a network service;
    receiving a first temporary device identifier (TUID) and a first temporary service identifier (TSID) for the network service;
    transmitting a service resume message to a network entity, the service resume message including the first TUID and the TSID for the network service; and establishing, based on the service resume message, a second security context with the network service.

13. The method of claim 12, further comprising transmitting an indication that the device is entering a low-powered state.

14. The method of claim 12, further comprising receiving a second TUID and a second TSID.

15. The method of claim 14, wherein the second security context is established based on the second TUID and the second TSID.

16. The method of claim 12, further comprising transmitting a request for a paging identifier to a paging service of the wireless network.

17. The method of claim 16, further comprising receiving a paging identifier from the wireless network in response to the request for the paging identifier.

18. The method of claim 16, further comprising receiving a paging message from the paging service.

19. The method of claim 18, wherein the service resume message is transmitted in response to the received paging message.

20. The method of claim 18, wherein the paging message includes the paging identifier and the first TSID.

21. The method of claim 20, wherein the paging identifier is used by a plurality of network services.

22. The method of claim 18, wherein the paging message includes a service specific paging identifier.

* * * * *